US007698076B2

(12) United States Patent
Ivey et al.

(10) Patent No.: US 7,698,076 B2
(45) Date of Patent: Apr. 13, 2010

(54) SYSTEM TO MANAGE MAINTENANCE OF A PIPELINE STRUCTURE, PROGRAM PRODUCT, AND RELATED METHODS

(75) Inventors: Ronald Ivey, Houston, TX (US); C. Scott Lee, Orlando, FL (US)

(73) Assignee: Veolia ES Industrial Services, Inc., League City, TX (US)

( * ) Notice: Subject to any disclaimer, the term of this patent is extended or adjusted under 35 U.S.C. 154(b) by 446 days.

(21) Appl. No.: 11/543,447

(22) Filed: Oct. 5, 2006

(65) Prior Publication Data

US 2007/0083398 A1 Apr. 12, 2007

Related U.S. Application Data

(60) Provisional application No. 60/724,483, filed on Oct. 7, 2005.

(51) Int. Cl.
*G01B 3/44* (2006.01)
*G06F 19/00* (2006.01)

(52) U.S. Cl. .......................................... 702/34; 700/110
(58) Field of Classification Search ................ 703/1, 703/2, 7–10; 700/110; 702/34, 35, 179, 702/182, 51, 181, 184, 183, 36; 714/1, E11.02; 73/592; 285/15; 405/184.1; 705/1, 7
See application file for complete search history.

(56) References Cited

U.S. PATENT DOCUMENTS 4,998,208 A * 3/1991 Buhrow et al. .............. 702/35
5,540,096 A * 7/1996 Woodcock et al. ............ 73/579
6,223,143 B1 * 4/2001 Weinstock et al. ............ 703/17
6,556,924 B1 * 4/2003 Kariyawasam et al. ........ 702/34
6,876,992 B1 * 4/2005 Sullivan ....................... 706/47
7,054,799 B1 * 5/2006 Hartell et al. .................. 703/2
7,277,822 B2 * 10/2007 Blemel ........................ 702/183
2003/0171879 A1 * 9/2003 Pittalwala et al. ............. 702/34
2005/0209817 A1 * 9/2005 Kathula et al. .............. 702/179
2006/0025937 A1 * 2/2006 Gao et al. ..................... 702/35

OTHER PUBLICATIONS

Pipeline Safety Improvement Act of 2002; pp. 1-28.*

* cited by examiner

*Primary Examiner*—Igor Borissov
(74) *Attorney, Agent, or Firm*—Bracewell & Giuliani LLP

(57) ABSTRACT

A system to manage and analyze conditions of pipeline structures, program product, and associated methods are provided. The system can include a computer defining a pipeline management computer having a processor and memory coupled to the processor to store operating instructions therein to manage and analyze conditions of the pipeline structure. The pipeline management computer can also include a display in communication with the processor to display pipeline project and client entity data and a user interface coupled to the processor to provide the pipeline management user with access to manipulate pipeline project and client entity data. A pipeline management database is provided accessible to the processor of the pipeline management computer. The database can include database records associated with at least one pipeline project related to database records associated with a pipeline management client entity. The system can also include pipeline management program product stored in the memory of the pipeline management computer to manage and analyze pipeline projects.

32 Claims, 23 Drawing Sheets

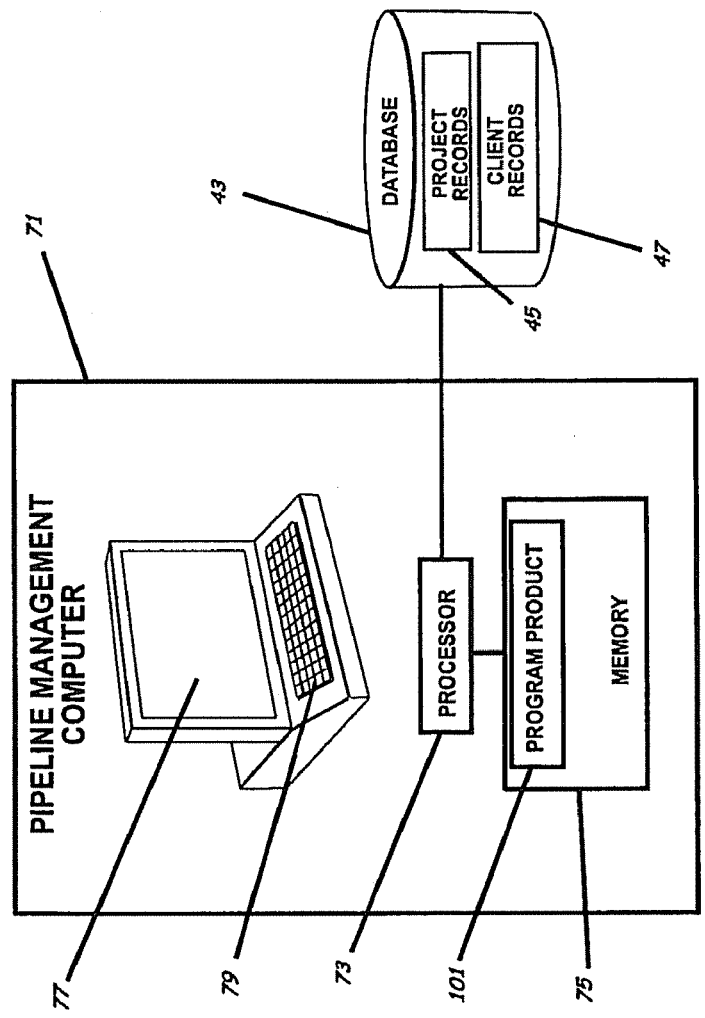
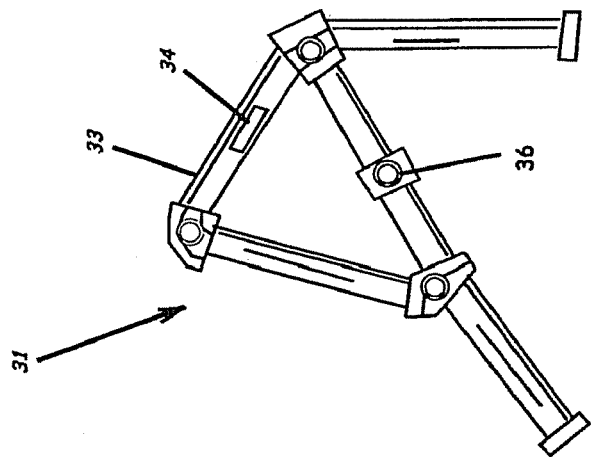
FIG. 2.

FIG.7.

| SEGMENT CODE | DETECT TOTAL | IMPACT TOTAL | FAILURE PROBABILITY TOTAL | COST ESTIMATE (1,000s) | ENTRY COMPLETE | SCHEDULE REPAIR | PIPE DIAMETER | LENGTH OF SEGMENT | SLOPE | MANHOLE UP STREAM | MANHOLE DOWN STREAM |
|---|---|---|---|---|---|---|---|---|---|---|---|
| 1-New | 28 | 250 | 40 | $5.00 | ☑ | ☑ | 8 | 30 | 0 | THX138 | THX137 |
| test02 | 34 | 225 | 10 | $3.50 | ☑ | ☐ | 7 | 50 | 0 | | |
| A4-B73 | 17 | 525 | 35 | $2.50 | ☑ | ☑ | 5 | 40 | 0 | | |
| ABC001 | 20 | 245 | 48 | $11.50 | ☑ | ☐ | 3 | 35 | 0 | | |
| 21m-37A | 75 | 900 | 145 | $100.00 | ☑ | ☑ | 0 | 200 | 0.6 | 21m | 37a |

PROJECT SUMMARY FOR:
TOTAL BUDGET: BUDGET ALLOCATED: %ALLOCATED:
RETURN   VIEW REPORT

FIG.8.

Score Weights – OVER 100
Severity [20]  Probability [30]  Impact [60]  TOTAL [100]

181

| SEGMENT 5 OF 5 FOR: "SEWER SYSTEM EVALUATION" |
|---|

RISK BASED SEWER MANAGEMENT PROGRAM

SEGMENT CODE  21m-37A    ☑ DATA ENTRY COMPLETE

[◀◀] [◀] [▶] [▶▶] [↶]  ADD SEGMENT    RETURN TO PROJECTS

185

| SEGMENT DATA | RISK FACTORS | IMPACT ANALYSIS | REPAIR COST |

DEFECT SEVERITY RANKING

201

PEAK PIPELINE SCORE: 50 — 205
MEAN PIPELINE SCORE: 75 — 207
MEAN DEFECT SCORE: 10 — 209

PROBABILITY OF FAILURE

203

AGE OF PIPELINE: > 30 YEARS — 211
MATERIALS OF CONSTRUCTION/COMPATIBILITY WITH WASTE STREAM: NOT RECOMMENDED MATERIALS — 213
DEPTH, COVER AND LOADING: CONCRETE PIPE, DEPTH < 3', COVER = DIRT, LOADING > 20,000 LB — 215
HISTORY: TWO OR MORE REPAIRS PER EVERY 20 — 217

| Category | Primary Criteria Description | Point Range |
|---|---|---|
| Defect Severity Ranking | | |
| | 1. Peak Pipeline Score | 0 – 100 |
| | 2. Mean Pipeline Score | varies |
| | 3. Mean Defect Score | varies |

FIG.12.

| Category | Primary Criteria Description | Point Range |
|---|---|---|
| Probability of Failure | | |
| | 1. Age of Pipeline | 0 – 100 |
| | 2. Materials of Construction/Compatibility with Waste Stream | 0 – 100 |
| | 3. Depth, Cover and Loading | 0 – 100 |
| | 4. History | 0 – 100 |
| | Value Range for Probability of Failure | 0 – 400 |

FIG. 13.

| Criteria Description | Detailed Criteria | Point Value |
|---|---|---|
| Age of Pipeline | | |
| | < 10 years | 0 |
| | 10 – 20 years | 5 |
| | 20 – 30 years | 8 |
| | > 30 years | 10 |

FIG. 14.

| Criteria Description | Detailed Criteria | Point Value |
|---|---|---|
| Materials of Construction/Compatibility with Waste Stream | | |
| | Recommended Materials | 0 |
| | Satisfactory Materials | 25 |
| | Not Recommended Materials | 50 |
| | Incompatible Materials | 100 |

FIG. 15.

| Criteria Description | Detailed Criteria | Point Value |
|---|---|---|
| Depth, Cover and Loading | | |
| Steel Pipe | Depth > 3', Cover = Paved, Loading < 20,000 LB | 0 |
| | Depth < 3', Cover = Paved, Loading < 20,000 LB | 10 |
| | Depth < 3', Cover = Dirt, Loading > 20,000 LB | 50 |
| Concrete Pipe | Depth > 3', Cover = Paved, Loading < 20,000 LB | 0 |
| | Depth < 3', Cover = Paved, Loading < 20,000 LB | 20 |
| | Depth < 3', Cover = Dirt, Loading > 20,000 LB | 75 |
| PVC or Clay Pipe | Depth > 3', Cover = Paved, Loading < 20,000 LB | 0 |
| | Depth < 3', Cover = Paved, Loading < 20,000 LB | 50 |
| | Depth < 3', Cover = Dirt, Loading > 20,000 LB | 100 |

| Criteria Description | Detailed Criteria | Point Value |
|---|---|---|
| History | | |
| | No history of pipe segment repairs | 0 |
| | One repair per every 20' | 5 |
| | Two or more repairs per every 20' | 10 |

FIG.16.

SEGMENT 5 OF 5 FOR: "SEWER SYSTEM EVALUATION"

RISK BASED SEWER MANAGEMENT PROGRAM

SEGMENT CODE 21m-37A  ☑ DATA ENTRY COMPLETE

ADD SEGMENT    RETURN TO PROJECTS

SEGMENT DATA | RISK FACTORS | IMPACT ANALYSIS | REPAIR COST

IMPACT ANALYSIS

IMPACTS TO EMPLOYEES: EXPOSURE LEVELS EXCEED OSHA IDLH LEVELS — 221

IMPACTS TO OPERATIONS: RESULTS IN SHUTDOWN OF PROCESS UNIT UNTIL PROBLEM — 223

ONSITE SOIL, GROUNDWATER OR SURFACE WATER CONTAMINATION: MINOR IMPACT REQUIRING CLEAN-UP — 225

VIOLATION OF AIR POLLUTION PERMIT LIMITS: NOTIFICATION OF PERMITTING AGENCY REQUIRED — 227

IMPACT TO OFFSITE PERSONS: TEMPORARY IMPACT RESULTING IN EVACUATION — 229

IMPACTS TO OFFSITE RESIDENTIAL AREAS: NO IMPACT — 231

IMPACTS TO OFFSITE BUSINESSES OR ORGANIZATIONS: NO IMPACT — 233

OFFSITE SOIL, GROUNDWATER OR SURFACE WATER CONTAMINATION: NO IMPACT — 235

VIOLATION OF LOCAL, STATE OR FEDERAL ENVIRONMENTAL REGULATIONS: IMPACT REQUIRING NOTIFICATION ONLY — 237

FIG.17.

| Category | Primary Criteria Description | Point Range |
|---|---|---|
| Impact Analysis | | |
| | 1. Impacts to Employees | 0 – 100 |
| | 2. Impacts to Operations | 0 – 100 |
| | 3. Onsite Soil, Groundwater or Surface Water Contamination | 0 – 100 |
| | 4. Violation of Air Pollution Permit Limits | 0 – 100 |
| | 5. Impacts to Offsite Persons | 0 – 100 |
| | 6. Impacts to Offsite Residential Areas | 0 – 100 |
| | 7. Impacts to Offsite Businesses or Organizations | 0 – 100 |
| | 8. Offsite Soil, Groundwater or Surface Water Contamination | 0 – 100 |
| | 9. Violations of Local, State or Federal Environmental Regulations | 0 – 100 |
| | Value Range for Impact Analysis | 0 – 900 |

FIG.18.

| Criteria Description | Detailed Criteria | Point Value |
|---|---|---|
| Impacts to Employees | | |
| | No Impact | 0 |
| | Slight Temporary Impact, No Effects | 20 |
| | Short Term Irritation due to exposure, no long term effects | 50 |
| | Exposure Levels Exceed OSHA PEL for work shift | 80 |
| | Exposure Levels Exceed OSHA IDLH levels | 100 |
| | Explosive Vapor Concentrations Exceed LEL | 100 |
| | Long-term health impacts to Employees | 100 |

FIG.19.

| Criteria Description | Detailed Criteria | Point Value |
|---|---|---|
| Impacts to Operations | | |
| | No Impact | 0 |
| | Results in revised work schedules until problem is fixed | 50 |
| | Results in shutdown of process unit until problem is fixed | 80 |
| | Results in shutdown of Facility until problem is fixed | 100 |

FIG.20.

| Criteria Description | Detailed Criteria | Point Value |
|---|---|---|
| Onsite Soil, Groundwater or Surface Water Contamination | | |
| | No impact | 00 |
| | Minor impact requiring minor clean-up | 25 |
| | Impact requiring remediation of only one medium | 75 |
| | Impact requiring remediation of more than one medium | 100 |

FIG.21.

| Criteria Description | Detailed Criteria | Point Value |
|---|---|---|
| Violation of Air Pollution Permit Limits | | |
| | No Impact, no notification required | 0 |
| | Notification of permitting agency required | 50 |
| | Concentration or quantity of release violates existing air permit | 100 |

FIG.22.

| Criteria Description | Detailed Criteria | Point Value |
|---|---|---|
| Impacts to Offsite Persons | | |
| | No Impact | 0 |
| | Temporary irritation, no long-term impact | 50 |
| | Temporary impact, public notification required | 75 |
| | Temporary impact resulting in evacuation | 100 |
| | Potential long-term adverse health impacts | 100 |

FIG.23.

| Criteria Description | Detailed Criteria | Point Value |
|---|---|---|
| Impacts to Offsite Residential Areas | | |
| | No Impact | 0 |
| | Temporary impact | 50 |
| | Temporary impact, public notification required | 75 |
| | Long-term impact | 100 |

FIG. 24.

| Criteria Description | Detailed Criteria | Point Value |
|---|---|---|
| Impacts to Offsite Businesses or Organizations | | |
| | No Impact | 0 |
| | Temporary impact | 50 |
| | Temporary impact, public notification required | 75 |
| | Long-term impact | 100 |

FIG. 25.

| Criteria Description | Detailed Criteria | Point Value |
|---|---|---|
| Offsite Soil, Groundwater or Surface Water Contamination | | |
| | No impact | 0 |
| | Minor impact requiring minor clean-up | 50 |
| | Impact requiring remediation of only one medium | 75 |
| | Impact requiring remediation of more than one medium | 100 |

FIG. 26.

| Criteria Description | Detailed Criteria | Point Value |
|---|---|---|
| Violations of Local, State or Federal Environmental Regulations | | |
| | No Impact | 0 |
| | Impact requiring notification only | 50 |
| | Impact potentially resulting in fines, penalties | 100 |

| Category | Primary Criteria Description | PointRange/Value |
|---|---|---|
| Estimated Repair Cost | 1. Pipeline Diameter | Varies |
| | 2. Pipeline Material | Varies |
| | 3. Depth of Bury | Varies |
| | 4. Cover Material | Varies |
| | 5. Length of Area to Be Repaired | Varies |
| | 6. Section cost | Varies |

FIG.29.

SYSTEM TO MANAGE MAINTENANCE OF A PIPELINE STRUCTURE, PROGRAM PRODUCT, AND RELATED METHODS

RELATED APPLICATIONS

The present application claims priority to and the benefit of U.S. Provisional Application No. 60/724,483, by Ronald Ivey et al., titled "System to Manage Maintenance of a Pipeline, Structure, Program Product, and Related Methods," filed on Oct. 7, 2005, and is incorporated herein by reference in its entirety.

BACKGROUND OF THE INVENTION

1. Field of the Invention

The present invention relates generally to pipelines, particularly to pipeline structure management. More specifically, the present invention relates to systems, program products, and related methods to manage pipeline structures.

2. Description of the Related Art

Worldwide there are millions of miles of underground pipes to carry sewage, sanitary and storm water; potable water; natural gas; gasoline; and various forms of oil or chemicals. Pipeline companies typically have a pipeline safety program which includes a repair management program. The pipeline safety program can provide for routine identification of pipeline defects and review of pipeline integrity. Often such pipeline safety programs are performed, for example, through review of previous internal and third party produced inspection reports developed by personnel with demonstrated expertise in interpreting inspection report data. Such programs can also include excavation of defects identified by the reports for visual examination of the defects. Such inspection programs can also include use of electronic devices such as, for example, pipeline pigs capable of performing visual (video) inspections and/or magnetic inspections to determine the cause of the failure and verify the integrity of the pipeline.

Inspection and repair of the pipelines is critical due to the potential risks to the environment when the pipelines rupture and due to the high costs of repair or replacement. Risk assessment for most pipelines has been based on a comparison of the pipeline segment in question to the experience-based norm of the individual assessors. Based on the specific experience of the expert sent to a particular site, the determined risk can vary by a wide margin between pipeline segments. Thus, recognized by the Applicant is the need for a system, program product, and method to repetitively and accurately determine risk posed by a defect within a pipeline segment. Also recognized is the need for a system, program product, and method that allows for consistent assessment of probability of failure of pipeline segments and impact of such failure.

In a relatively large pipeline having numerous pipeline segments, especially when constrained fiscally, it is particularly difficult to quantify the cost of repairs to a pipeline segment and to provide for a cost-effective allocation of funds to form a repair and maintenance schedule. Thus, also recognized by the Applicant is the need for a system, program product, and method which can allow the user to compare risk, repair cost, and cost effectiveness between multiple pipeline segments of a pipeline structure.

SUMMARY OF THE INVENTION

In view of the foregoing, embodiments of the present invention advantageously provide a system, program product, and method to manage pipeline structures, which can quantify the relative risk posed by a defect within a pipeline segment of a pipeline. Advantageously, according to embodiments of the present convention, risk can be calculated using data describing the structural integrity of the pipeline segment, a calculated probability of a failure occurring due to a structural defect in the pipeline segment, and a calculated impact of such a failure. Cost-effectiveness of repairing each section of a pipeline project can also be determined. Advantageously, according to embodiments of the present invention, risk, repair cost, and cost-effectiveness for each segment can be compared to those of other projects segments within the pipeline to allow for optimal selection of which repairs should be performed first. Advantageously, the cost of removing risk can be determined which that allows for development of a plan to realize maximum value for a finite amount of pipeline structure rehabilitation plan dollars.

More specifically, in an embodiment of the present invention, a system can include a pipeline structure having a plurality of pipeline segments to define a pipeline project. The system can also include a computer defining a pipeline management computer having a processor and memory coupled to the processor to store operating instructions therein to manage and analyze conditions of the pipeline structure. The pipeline management computer can also include a display in communication with the processor to display pipeline project and client entity data and a user interface coupled to the processor to provide the pipeline management user with access to manipulate pipeline project and client entity data. A pipeline management database is provided accessible to the processor of the pipeline management computer. The database can include database records associated with one or more pipeline projects related to database records associated with a pipeline management client entity.

The system can also include pipeline management program product stored in the memory of the pipeline management computer to manage and analyze pipeline projects. The pipeline management program product can include a pipeline segment storer, which in response to user input commands, can store pipeline general attributes data related to a pipeline segment associated with a pipeline project, and can include a pipeline defect severity score determiner, which in response to pipeline defect data related to the pipeline segment can receive/determine at least one but preferably a plurality of defect severity ranking scores for the pipeline segment. The defect severity score can include a peak pipeline score, mean pipeline score, and mean defect score. A pipeline failure probability determiner, in response to pipeline specific attribute data related to the pipeline segment, probability of pipeline failure test data, and user input commands, can determine a probability of failure score for the pipeline segment, and a pipeline failure impact determiner, in response to selected failure impact data related to the pipeline segment, pipeline failure impact test data, and user input commands, can determine an impact of failure score for the pipeline segment. A repair cost determiner, in response to pipeline repair section data related to each determined sectional defect in the pipeline segments, defect repair method, repair cost data, and input commands, can determine an estimated repair cost of the pipeline segment.

According to an embodiment of the present invention, a risk determiner responsive to a selected one of the at least one determined defect severity score, determined probability of failure score, and determined impact of failure score for the pipeline segment, and responsive to defect severity weights, probability of failure weights, and impact of failure weights, can determine a comparative segment risk related to the pipeline segment. A repair cost effectiveness valuator responsive to the estimated repair cost and the determined segment risk can establish a comparative segment risk valuation for the pipeline segment. A risk percentage determiner responsive to the determined segment risk can determine a relative risk percentage of each of the plurality of pipeline segments, and a repair selector responsive to user input commands can indicate repair selection of each of the plurality of pipeline segments selected for repair. Correspondingly, a risk reduction determiner responsive to the determined relative risk percentage and repair selection for each of the plurality of pipeline segments can determine a total reduced risk percentage defined by a sum of the risk percentages for pipeline segments selected for repair and can determine a residual risk percentage defined by a sum of the risk percentages for the pipeline segments remaining unselected for repair, to thereby enhance risk management.

According to an embodiment of the present invention, a repair selector responsive to user input commands can indicate selection of the plurality of pipeline segments selected for repair, and a budget determiner responsive to a total available budget and estimated repair cost and repair selection for each of the plurality of pipeline segments can determine a total allocated budget defined by the sum of the estimated repair costs for each of the plurality of pipeline segments selected for repair and can determine a percent allocated budget, to thereby aid the user to maximize use the available budget dollars and/or provide evidence of a need to adjust the project budget. Correspondingly, a budget indicator is provided which, in response to the determined percentage of total allocated budget relative to total available budget can indicate to the user when the total allocated budget exceeds the total available project budget.

According to an embodiment of the present invention the pipeline management computer further defines a pipeline management server. In this embodiment, advantageously, the system can further include a computer or other communication network, and one or more user computer accessible to the communication network. The user computers can include a processor and memory coupled to the processor to store operating instructions therein to send pipeline data to the pipeline management server, a display in communication with the processor to display pipeline data, and an input device or other user interface coupled to the processor to allow access to the pipeline management program product, to thereby remotely perform the above described analytical functions.

Embodiments of the present invention also include methods of managing and analyzing conditions of pipeline structures. For example, according to an embodiment of the present invention, a method can include the steps of storing pipeline segment general attributes data related to a pipeline segment associated with a pipeline project in a database, and determining at least one defect severity score for the pipeline segment responsive to pipeline defect data related to the pipeline segment. The pipeline defect data can, for example, include determined structural defects in the pipeline segment and an industry standard ranking of structural defects. The steps can also include determining a probability of failure score for the pipeline segment responsive to pipeline specific attribute data related to the pipeline segment and probability of pipeline failure test data, and determining an impact of failure score for the pipeline segment responsive to selected failure impact data related to the pipeline segment and pipeline failure impact test data.

The method can also include the steps of determining an estimated repair cost of the pipeline segment responsive to pipeline repair section data related to each determined sectional defect in the pipeline segment, a selected defect repair method, and repair cost data, and can include determining a comparative segment risk related to the pipeline segment responsive to a selected one of the at least one determined defect severity scores, determined probability of failure score, determined impact of failure score, and user provided defect severity weights, probability of failure weights, and impact of failure weights, to thereby enhance pipeline risk management. The method can further include the step of establishing a comparative segment risk valuation for the pipeline segment responsive to the estimated repair cost and the determined segment risk, to thereby enhance pipeline repair cost management.

According to an embodiment of the present invention, a method of managing and analyzing conditions of pipeline structures can include the step of determining a comparative segment risk related to each of a plurality of pipeline segments responsive to a determined defect severity score, a determined probability of failure score, and a determined impact of failure score, to allow a user to compare a risk of failure of each one of the plurality of pipeline segments due to observed defects with respect to each other of the plurality of pipeline segments, to thereby enhance pipeline risk management. The method can also include the step of determining a comparative percentage of segment risk related to each of the plurality of pipeline segments responsive to the determined segment risk for each respective one of the plurality of pipeline segments and total risk of each of the plurality of pipeline segments, to provide the user with a relative percentage of risk of each one of the plurality of pipeline segments with respect to each other of the plurality of pipeline segments, to thereby enhance pipeline risk management.

According to an embodiment of the present invention, the method can also include selecting a subset of the plurality of pipeline segments for repair, determining a total reduced risk percentage responsive to the repair selection and the percentage of segment risk for each of the pipeline segments selected for repair, and determining a residual risk percentage for the pipeline segments remaining unselected for repair responsive to the repair selection, to thereby enhance risk management. The method can also include determining an estimated repair cost of each of the pipeline segments responsive to pipeline repair section data and repair cost data for the observed defects, and can include establishing a separate comparative segment risk valuation for each of the plurality of pipeline segments responsive to the estimated repair cost and the determined segment risk for each respective pipeline segment to provide the user with a relative cost-effectiveness of repairing each respective one of the plurality of pipeline segments with respect to each other of the plurality of pipeline segments, to thereby enhance pipeline repair cost management.

Embodiments of the present invention also include a computer readable medium that is readable by a computer to manage and analyze conditions of pipeline structure. According to an embodiment of the present invention, a computer readable medium includes a set of instructions that, when executed by a computer, can cause the computer to perform the operation of determining a comparative segment risk related to each of a plurality of pipeline segments of a pipeline structure to allow a user to compare a risk of failure of each one of the plurality of pipeline segments due to observed defects with respect to each other of the plurality of pipeline segments, to thereby enhance pipeline risk management. The instructions can also include those to perform the operation of determining a comparative percentage of segment risk related to each of the plurality of pipeline segments responsive to the determined segment risk for each respective one of the plurality of pipeline segments and total risk of each of the plurality of pipeline segments defined as the sum of the determined segment risk for each of the plurality of pipeline segments, to provide the user with a relative percentage of risk of each one of the plurality of pipeline segments with respect to each other of the plurality of pipeline segments, to thereby enhance pipeline risk management.

According to an embodiment of the present invention, the computer readable medium can also include instructions to perform the operations of receiving a pipeline segment repair selection status for a subset of the plurality of pipeline segments selected for repair responsive to user input, determining a total reduced risk percentage responsive to repair selection and the percentage of segment risk for each of the pipeline segments selected for repair, to thereby enhance risk management, and determining a residual risk percentage defined as a sum of the segment risk percentages for each of the pipeline segments remaining unselected for repair responsive to the repair selection to thereby enhance risk management.

According to an embodiment of the present invention, the computer readable medium can also include instructions to perform the operations of determining an estimated repair cost of each of the pipeline segments responsive to pipeline repair section data and repair cost data for the observed defects, and establishing a separate comparative segment risk valuation for each of the plurality of pipeline segments responsive to the estimated repair cost and the determined segment risk for each respective pipeline segment to provide the user with a relative cost-effectiveness of repairing each respective one of the plurality of pipeline segments with respect to each other of the plurality of pipeline segments, to thereby enhance pipeline repair cost management.

Embodiments of the present invention further can provide a computer memory containing stored in signal bearing media a database. The database can contain data in computer-readable format including, for example, data related to a plurality of pipeline segments and data related to at least one pipeline management client entity. More specifically, the database can contain data in computer readable format indicating pipeline segment attributes of a plurality of pipeline segments of a pipeline project, and data indicating a comparative segment risk for each of the plurality of pipeline segments. The comparative segment risk indicates a relative risk of failure of each one of the plurality of pipeline segments due to observed defects with respect to each other of the plurality of pipeline segments. According to an embodiment of the present invention, the database can also include data indicating a comparative segment risk valuation for each of the plurality of pipeline segments. The comparative segment risk valuation indicates a relative cost-effectiveness of repairing each respective one of the plurality of pipeline segments with respect to each other of the plurality of pipeline segments.

Advantageously, embodiments of the present invention can allow for the impact of a pipeline defect to be quantified on the basis of safety considerations, environmental damage resulting from a leak through the defect out into the surrounding soil and/or water and disruption to operations. The system, program product, and methods can allow for the consistent assessment of the risk of failure of pipeline segments throughout a facility or utility, from year to year, and from facility/utility to facility/utility. In addition, the systems, program products, and methods can provide a basis of quantifying the cost of repairs to a pipeline segment, and using this information to develop a repair budget and schedule. A repair schedule can be created, for example, based upon the cost of the repairs, the amount of "risk" eliminated per dollar spent on a repair, and upon the cost-effectiveness of the particular repair.

Advantageously, embodiments of the system apply a pipeline management program product initially developed for application in industrial and municipal sewer systems, which includes logic/algorithms readily applicable to other pipeline applications, including, for example, natural gas transmission lines and potable water lines. Such logic provides for identifying a set of criteria, setting values for the criteria, revising the algorithm as necessary to tailor the logic to the specific client, and revising any ancillary higher level operating programs. For example, according to an embodiment of the present invention, the pipeline management program product is configured to operate in Microsoft Access® due to some advantages, particularly cost advantages, with respect to program support. According to various other embodiments of the present invention, the pipeline management program product is provided, stand-alone, which provides for expanded access capabilities and enhanced security features over that of Microsoft Access®. Both variations provide for a system which can to meet client infrastructure maintenance needs while controlling costs and maintaining production schedules.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 2 is a schematic block diagram of a system to manage and analyze conditions of pipeline structures according to an embodiment of the present invention;

FIG. 7 is a schematic diagram of a graphical user interface for a pipeline management program product according to an embodiment of the present invention;

FIG. 8 is a schematic diagram of a graphical user interface for a pipeline management program product according to an embodiment of the present invention;

FIG. 10 is a schematic diagram of a graphical user interface for a pipeline management program product according to an embodiment of the present invention;

FIG. 11 is a schematic diagram of a table indicating point range values for three defect score methods according to an embodiment of the present invention;

FIG. 12 is a schematic diagram of a table indicating point range values for probability of pipeline segment failure categories according to an embodiment of the present invention;

FIG. 13 is a schematic diagram of a table indicating point values for probability of pipeline segment failure category attributes according to an embodiment of the present invention;

FIG. 14 is a schematic diagram of a table indicating point values for probability of pipeline segment failure category attributes according to an embodiment of the present invention;

FIG. 15 is a schematic diagram of a table indicating point values for probability of pipeline segment failure category attributes according to an embodiment of the present invention;

FIG. 16 is a schematic diagram of a table indicating point values for probability of pipeline segment failure category attributes according to an embodiment of the present invention;

FIG. 17 is a schematic diagram of a graphical user interface for a pipeline management program product according to an embodiment of the present invention;

FIG. 18 is a schematic diagram of a table indicating point range values for impact of pipeline segment failure categories according to an embodiment of the present invention;

FIG. 19 is a schematic diagram of a table indicating point values for impact of pipeline segment failure category attributes according to an embodiment of the present invention;

FIG. 20 is a schematic diagram of a table indicating point values for impact of pipeline segment failure category attributes according to an embodiment of the present invention;

FIG. 21 is a schematic diagram of a table indicating point values for impact of pipeline segment failure category attributes according to an embodiment of the present invention;

FIG. 22 is a schematic diagram of a table indicating point values for impact of pipeline segment failure category attributes according to an embodiment of the present invention;

FIG. 23 is a schematic diagram of a table indicating point values for impact of pipeline segment failure category attributes according to an embodiment of the present invention;

FIG. 24 is a schematic diagram of a table indicating point values for impact of pipeline segment failure category attributes according to an embodiment of the present invention;

FIG. 25 is a schematic diagram of a table indicating point values for impact of pipeline segment failure category attributes according to an embodiment of the present invention;

FIG. 26 is a schematic diagram of a table indicating point values for impact of pipeline segment failure category attributes according to an embodiment of the present invention;

FIG. 27 is a schematic diagram of a table indicating point values for impact of pipeline segment failure category attributes according to an embodiment of the present invention;

FIG. 28 is a schematic diagram of a graphical user interface for a pipeline management program product according to an embodiment of the present invention;

FIG. 29 is a schematic diagram of a table indicating point range and values for pipeline segment estimated repair cost categories according to an embodiment of the present invention;

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

As shown in FIGS. 1-34, embodiments of the present invention were developed as a tool to be able to quantify the relative risk posed by a defect, e.g., hole, crack, or failed joint, within a pipeline segment, e.g., sewer, or stormwater drain, to the owner of the pipeline. The risk can be calculated using a program product including an algorithm built using data about the structural integrity of the pipeline segment from a combination of commercially available pipeline inspection software and/or individual user experience, a calculated/determined probability of a failure occurring due to a structural defect in the pipeline segment, and a calculated/determined impact of such a failure. The impact can be quantified on the basis of safety considerations, environmental damage resulting from a leak through the defect out into the surrounding soil and/or water and disruption to operations.

The systems, program products, and methods can allow for the consistent assessment of the risk of failure of pipeline segments throughout a facility or utility, from year to year, and from facility/utility to facility/utility. In addition, the system, program product, and methods can provide a basis of quantifying the cost of repairs to a pipeline segment, and using this information, can allow a user to develop a repair budget and schedule. The repair schedule can be created, for example, based upon the cost of the repairs, or upon the amount of "risk" eliminated per dollars spent on a repair. Advantageously, as perhaps the shown in FIGS. 33A-B, embodiments of the present invention provides a system and related methods necessary to take a user from an initial examination and cleaning of a pipeline structure 31 to the provision of deliverables to a specialized client interface (not shown). As perhaps best shown in FIG. 34, embodiments the present invention can combine with a needs assessment, systems cleaning, system inspection, component prioritization and a system rehabilitation to form a systematic approach to pipeline structure management.

Figure 1:
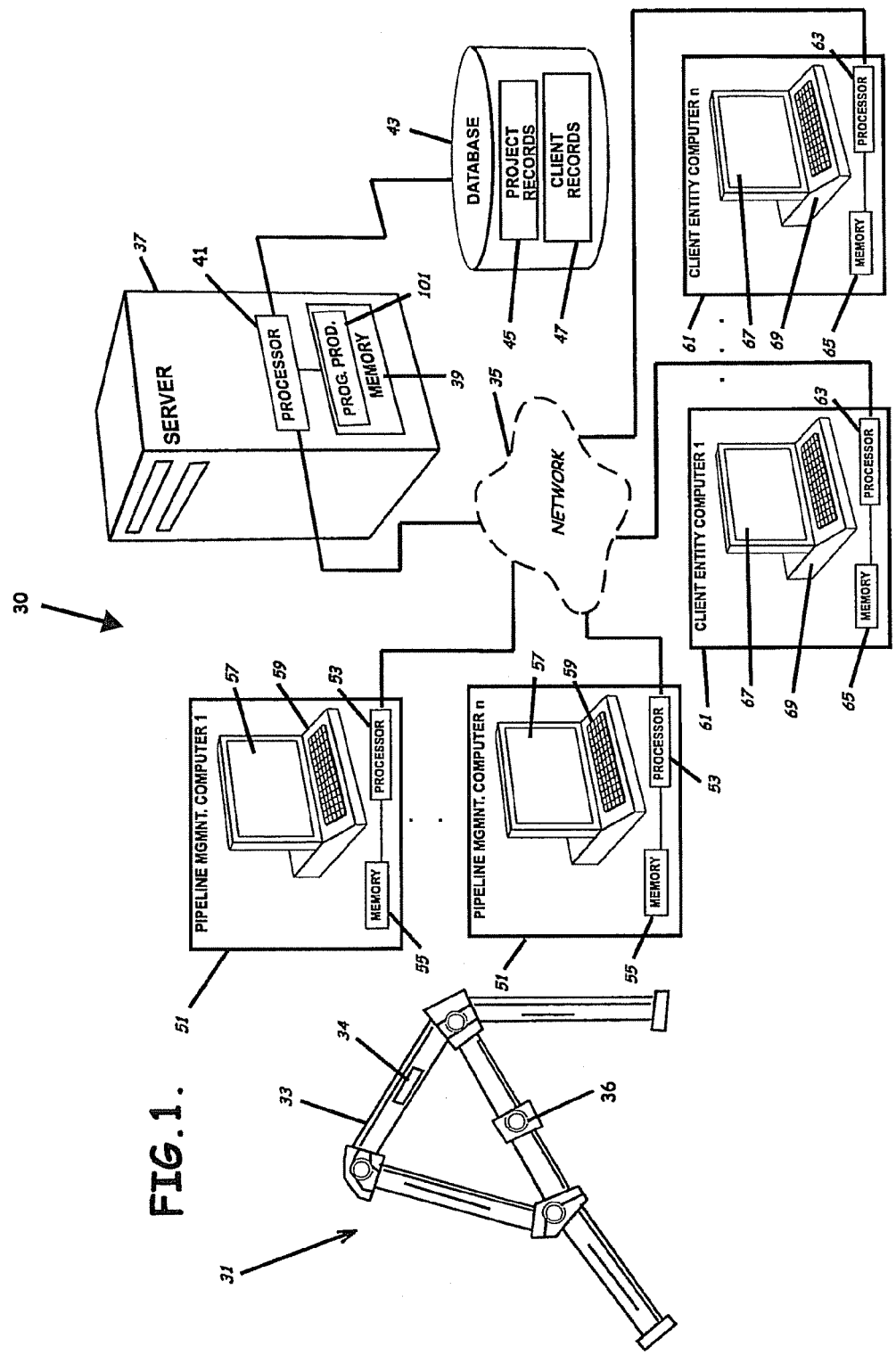
FIG. 1 is a schematic block diagram of a system to manage and analyze conditions of pipeline structures according to an embodiment of the present invention.

As perhaps best shown in FIG. 1, illustrated is a system 30 to manage and analyze conditions of pipeline structures. The managed portion of the system 30 includes a pipeline structure 31 to be managed having a plurality of pipeline segments 33, some of which needing repairs, to define a pipeline project. The managerial portion of the system 30 includes a computer or other communication network 35 as known to those skilled in the art and a computer accessible to the communication network 35 to define a pipeline management server 37 having memory 39 coupled to a processor 41 to store operating instructions therein to manage and analyze conditions of the pipeline structure 31. A pipeline management database 43 accessible to the processor 41 of the pipeline management server 37 is also provided. The database 43 can include database records 45 associated with one or more pipeline projects related to database records 47 associated with a pipeline management client entity.

Note, it should be understood that the preferred specific server identified above is given by way of example and that other types of servers or computers can be used. The server 37 shown schematically, for example, and in FIG. 1 represents a server or server cluster or server farm and is not limited to any individual physical server. The server site may be deployed as a server farm or server cluster managed by a serving or hosting provider. The number of servers and their architecture and configuration may be increased based on usage, demand and capacity requirements for the system 30.

The system 30 also includes a plurality of pipeline management user computers 51. Each pipeline management user computer 51 can be positioned at a separate pipeline management user site remote from the pipeline management server 37, accessible to the communication network 35, and can have a processor 53 and memory 55 coupled to the processor 53 to store operating instructions therein and to send data related to a pipeline projects and pipeline management client entities to the pipeline management server 37. Each pipeline management user computer 51 can also include a display 57 in communication with the processor 53 to display pipeline project and client entity data and a user interface 59 coupled to the processor 53 to provide the pipeline management user with access to manipulate pipeline project and client entity data.

The system 30 can also include a plurality of pipeline management client entity computers 61. Each pipeline management client entity computer 61 can be positioned at a separate pipeline management client entity user site remote from the pipeline management server 37, accessible to the communication network 35, and a processor 63 and memory 65 coupled to the processor 63 to store operating instructions therein and to receive database records. Each pipeline management client entity computer 61 also can include a display 67 in communication with the processor 63 to display pipeline project data and a user interface 69 coupled to the processor 63 to provide the pipeline management client entity with access to manipulate and view pipeline project data.

According to an embodiment of the present invention, rather than having a centralized pipeline management database 43 accessible to the processor 41 of the pipeline management server 37, as illustrated in FIG. 1, a separate database (not shown) can be provided at each pipeline management client entity remote site associated with the respective pipeline management client entity computer 61 to thereby store database records 45 associated with an associated one or more pipeline projects.

As shown in FIG. 2, in another embodiment of the present invention, the system 30 includes a pipeline structure 31 having a plurality of pipeline segments 33 to define a pipeline project. The system 30 also includes a computer or computers each defining a pipeline management computer 71 having a processor 73 and memory 75 coupled to the processor 73 to store operating instructions therein to manage and analyze conditions of the pipeline structure 31. Each pipeline management computer 71 can also include a display 77 in communication with the processor 73 to display pipeline project and client entity data and a user interface 79 coupled to the processor 73 to provide the pipeline management user with access to manipulate pipeline project and client entity data. A pipeline management database such as, for example, the database 43 is provided accessible to the processor 73 of the pipeline management computer 71. The database 43 can include database records 45 associated with one or more pipeline project related to database records 47 associated with a pipeline management client entity.

The system 30 can also include pipeline management program product 101 stored, for example, in the memory 39 of the pipeline management server 37 or in the memory 75 of the pipeline management computer 71 to manage and analyze pipeline projects. The pipeline management program product 101 includes functionality to allow pipeline management users to initialize to pipeline management client entities and new pipeline projects associated with such client entities. According to an embodiment of the present invention, the pipeline management program product 101 can include functionality to allow multiple pipeline management client entities to access the program product 101 to manage and analyze various associated pipeline projects. According to an alternative embodiment of the present invention, the pipeline management program product 101 is a web-based program that provides web-based functionality. Accordingly, beyond the installation of a common web browser, specialized software installation is not necessary. Because of such network-based functionality, such program product 101 is portable to multiple computer systems and is easily accessible by multiple concurrent users at a single time through online access.

Note, the pipeline management program product 101, according to an embodiment of the present invention, need not reside in its entirety in volatile memory, but can be selectively loaded, as necessary, according to various methodologies as known and understood by those skilled in the art. Note also, the pipeline management program product 101 can be in the form of microcode, programs, routines, and symbolic languages that provide a specific set or sets of ordered operations that control the functioning of the hardware and direct its operation, as known and understood by those skilled in the art. Note further, the pipeline management program product 101 can include instructions that when executed by pipeline management server 37 or pipeline management computer 71 can perform the various pipeline management, analysis, and reporting functions. Such functionality can be otherwise illustrated in the form of various functional modules, described below.

The users of the system 30, program product, and methods can enter pipeline segment data into the system 30 and view information from the system 30 by selecting from a number of buttons or icons displayed on a graphical user interface (GUI) from either a stand-alone computer, e.g., pipeline management computer 71, or a computer having access to a pipeline management server 37 accessible to the communication network 35, such as, for example, computers 51, 61. As understood by those skilled in the art, the instruction blocks in the memory of the computers 51, 61, 71, or server 37 can provide instructions to implement the graphical user interface.

Figure 3:
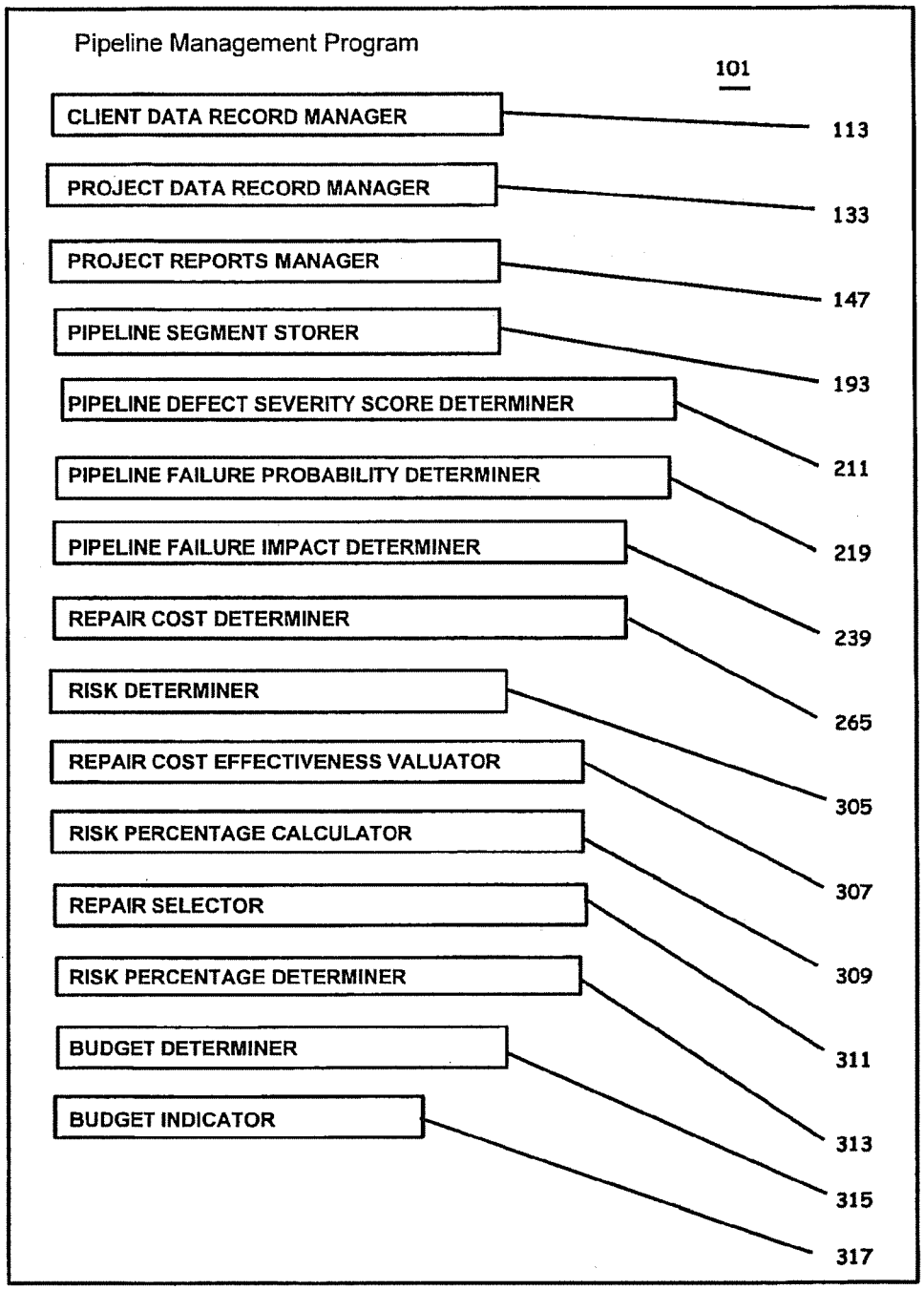
FIG. 3 is a schematic block diagram of a pipeline management program product according to an embodiment of the present invention.
Figure 4:
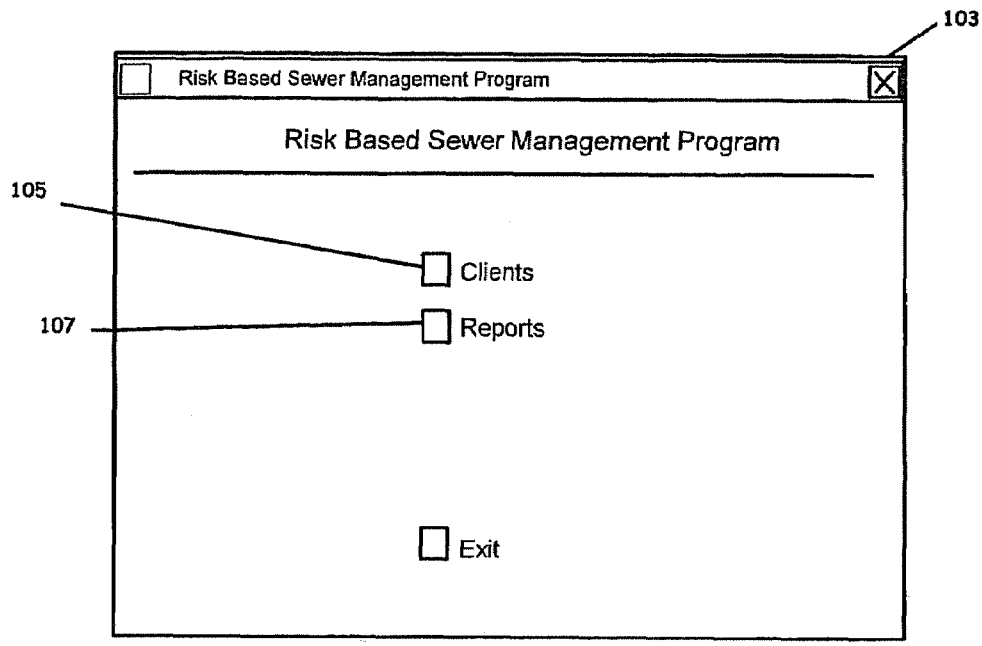
FIG. 4 is a schematic diagram of a graphical user interface for a pipeline management program product according to an embodiment of the present invention.

As shown in FIG. 4, according to an embodiment of the present invention, a user is provided an initial main menu screen view 103 including icons or buttons including a clients and reports button 105, 107. By selecting the client button 105, a client management screen 111 (FIG. 5) is provided. The client management screen 111 can include icons or buttons, which can access functionality within a client data record manager 113 (FIG. 3). The buttons, associated with functionality within the client data record manager 113 can include, for example, an add client button 115 selectable by a user to cause display of a new client data screen view which includes various text entry fields and user selectable links or buttons, e.g., a save button (not shown), to allow entry and saving of new pipeline management client entity data.

Figure 5:
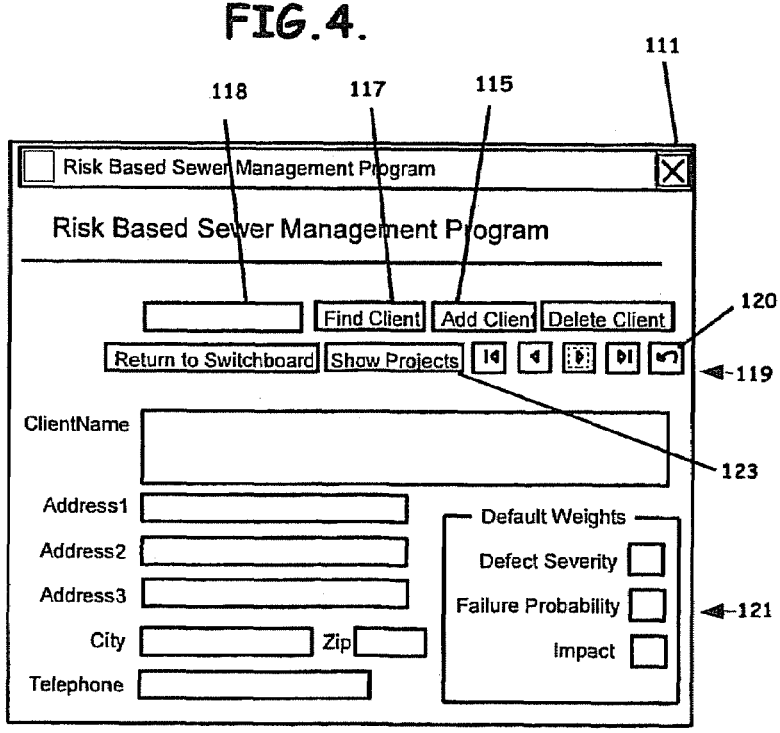
FIG. 5 is a schematic diagram of a graphical user interface for a pipeline management program product according to an embodiment of the present invention.

As shown in FIG. 5, the client management screen 111 can also include a find client button 117 associated with a text entry field 118 which can allow a user to enter either a client name or a few characters indicative of the client name into the text entry field 118 to allow searching for and retrieval of database records associated with a pipeline management client entity stored in the database 43. According to an embodiment of the present invention, if multiple clients satisfy such criteria, the user can utilize navigation buttons 119 to scroll through the client entities satisfying the search criteria or the results can be displayed in a list, drop-down menu, or other methodology known to those skilled in the art. According to the preferred embodiment of the present invention, the first client displayed is the first client beginning with those characters. Note, many of the following described screens include navigation buttons 119 which allow for moving to a first record, moving to a previous record, moving to a next record, and moving to a last record as known and understood by those skilled in the art. The navigation buttons 119 can also include an undue all changes button 120 which can allow for undoing, for example, all changes its last save and to allow for canceling an added record.

The client management screen 111 can also include other buttons such as, for example, a delete client button which can function to delete the current client after confirmation, and a return to switchboard button which returns the user to the main menu screen view 103. Note, a default weights table 121 can display default weights including defect severity, failure probability, and failure impact, described later, used to supply default weights for a new project. According to the preferred embodiment of the present invention, changing these values do not affect previously created projects. The client management screen 111 can also include a show projects button 123 which, when selected, can cause opening (displaying) a projects screen 131 (FIG. 6) for the displayed pipeline management client entity. The projects screen 131 can include icons or buttons, which can access various functionality within a project data record manager 133 (FIG. 3). The buttons, associated with functionality within the project data record manager 133 can include, for example, an add project button 135 selectable by a user to cause display of a new project data screen view (not shown) which includes various text entry fields and user selectable links or buttons, e.g., a save button, to allow entry and saving of new pipeline management project data.

Figure 6:
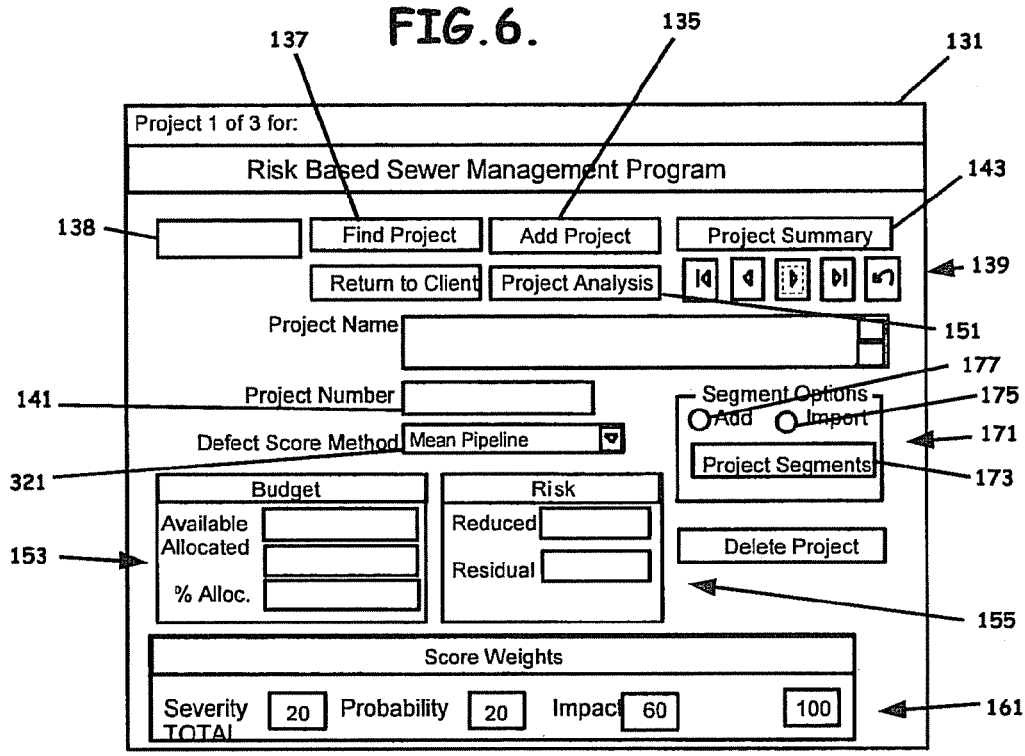
FIG. 6 is a schematic diagram of a graphical user interface for a pipeline management program product according to an embodiment of the present invention.

As shown in FIG. 6, the client project screen 131 can also include a find project button 137 associated with a text entry field 138 which can allow a user to enter either a project name or a few characters indicative of the project name into the text entry field 138 to allow searching for and retrieval of database records associated with a pipeline management project stored in the database 43. According to an embodiment of the present invention, if multiple projects satisfy such criteria, the user can utilize navigation buttons 139 to scroll through the project entities satisfying the search criteria or the results can be displayed in a list, drop-down menu, or other methodology known to those skilled in the art. According to the preferred embodiment of the present invention, the first project displayed is the first project beginning with those characters. The client project screen 131 can also include other buttons such as, for example, a delete project button which can function to delete the current project after confirmation, a return to client button which can return the user to the client management screen 111, and a return to switchboard button which returns the user to the main menu screen view 103. The client management screen 111 can also include a project number or identification input field 141 to allow a user to provide a unique project number, which advantageously, can be used to interface with other project management client entity analysis software.

The client project screen 131 can also include a project summary button 143 which, when selected, can cause opening or otherwise displaying a projects summary screen 145 (FIG. 7) for the displayed pipeline management project. The projects summary screen 145 can include icons or buttons, which can access various functionality within a project reports manager 147 (FIG. 3). The project summary screen 145 can include output fields including data summarizing an analysis of the displayed project, described later, such as, for example, defect scores associated with each of a plurality of named pipeline segments 33, a failure probability total for each pipeline segment 33, an impact total for each pipeline segment 33, a cost estimate to repair defects for each pipeline segment 33, and pipeline attribute data such as, for example, diameter, length, slope, and endpoint identification of each pipeline segment 33. Endpoint identification of each pipeline segment 33 can include, for example, an identified manhole 36 upstream and manhole downstream or an offset coordinate thereof. The project summary screen 145 can also include a view reports button 149 which can cause opening or otherwise display a printable summary sheet including report data described above. The project summary screen 145 can also include a total budget output field indicating a project budget supplied by the associated project management client entity and budget allocated and budget percent allocated output fields.

As shown in FIGS. 6, the client project screen 131 can also include a project analysis button 151 which can allow the user to sort and allocate a budget for the project segments, also described later. The client project screen 131 can further include a budget table or area 153 which includes a output fields such as, for example, an amount available output field which describes dollars budgeted for the project, an amount allocated output field which describes dollars assigned to repair specific pipeline segments 33, described later, and a percent allocated based on the user supplied project budget. The allocated and percent allocated fields are calculated during the "project analysis" process, described later. Additionally, the client project screen 131 can include an analyzed risk section or area 155 which can provide reduced and residual risk output fields which provide data also calculated during the same project analysis process.

The client project screen 131 can further include score weights 161, which can be initially populated from the default weights 121 (FIG. 5) on the client management screen 111. According to an embodiment of the present invention, the score weights 161 can be edited for each individual project of the associated project management client entity. The score weights 161 are used to establish the relative weight or importance, for example, of three primary risk categories: severity of a single defect 163 in a pipeline segment or the corresponding general structural condition of the pipeline segment 33; probability of a failure 165 within the same pipeline segment 33; and impact of a failure 167 occurring within the same pipeline segment 33. A risk algorithm, described later, utilizes the score weights 161. The sum of the score weights should equal 100. To help ensure the user does not incorrectly provide a set of weights which would otherwise render ineffective the risk algorithm, the user can receive a visual cue from output field 169 indicating the total does not equal 100 (see FIG. 8).

The severity, probability, and impact entry fields of the score weights 161 advantageously can allow the project management client entity to tailor the risk algorithm according to an individual, comparative, relative importance of the weighted components. For example, if the project management client entity, e.g., utility, is under an environmental consent order such that if the client entity were to have one more leak, the EPA would force the utility to cease operations, then such client entity may weigh the risk of an impact of a failure much higher relative to the probability of a failure or even the severity of a defect, and therefore, such weight components can be utilized to reflect the needs of the client entity, accordingly. Such weight components values can be determined by the pipeline management entity as a result of consultation with the pipeline management client entity in order to tailor the client entity's capital improvement program according to the individual client entity's needs. Further, a client entity such as, for example, a petroleum manufacturer or refinery may have several sites and in one state they may want to establish a relative risk importance from one perspective and in another state or another country they may want to establish a relative risk importance at a different way.

The client project screen 131 can also include a segment options section or area 171 which can include a project segments icon or button 173, which can access various pipeline segment functions of the pipeline management program product 101, described below. The segment options section or area 171 can include an import project segment data check field 175 which can initiate a communication link directly between the pipeline management program product 101 and various external pipeline inspection software programs such as, for example, Flexidata™, to cause import of previously entered pipeline segment data, to cause import of data from a standard software format, such as Microsoft Excel, or to cause import of data from a generic format, thereby obviating redundant manual data entry. The segment options section or area 171 can also include an add project segment check field 177 which can allow manual entry of pipeline segment data and analysis input data to provide an intuitive approach to a user to improve understanding of the analysis of the displayed project. Note, use of Flexidata™ has certain advantages as it provides for an ability to detect and track changes due to deterioration over time and allows for graphical display of a location of detected defects along with a description thereof.

Figure 9:
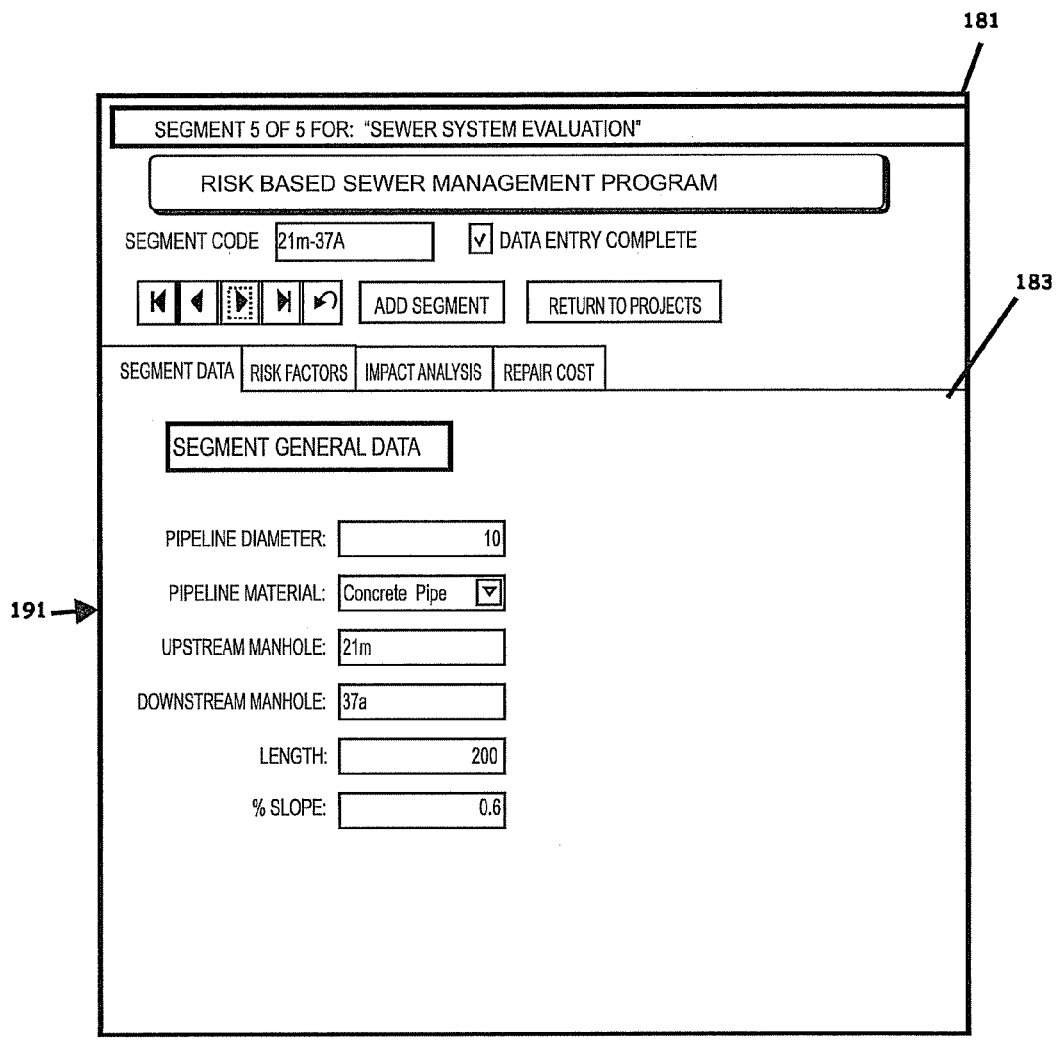
FIG. 9 is a schematic diagram of a graphical user interface for a pipeline management program product according to an embodiment of the present invention.

As perhaps best shown in FIG. 9, according to an embodiment of the present invention, the project segments icon or button 173 (FIG. 6), when selected, can cause opening or otherwise displaying a project segment screen 181 for the displayed pipeline management project. The project segment screen 181 can have, for example, four pipeline segment data entry tabs: segment general data 183 (FIG. 9); risk factors 185 (FIG. 10); impact analysis 187 (FIG. 17); and repair cost 189 (FIG. 28). The segment general data tab 183 can include a combination of text entry fields and drop-down menus 191 which can allow for entry and storage of general attributes data related to the pipeline segment 33 associated with the selected or displayed pipeline project. The text entry fields/drop-down menu or menus 191, for example, can include a pipeline segment diameter, a pipeline material, a segment length, an upstream manhole location, a downstream manhole location, and a percentage slope of the pipeline segment. A pipeline segment storer 193 (FIG. 3) can receive and store data entered in the text entry fields/menu or menus 191 in response to user input/selection.

As perhaps best shown in FIG. 10, the risk factors tab 185 can include a defect severity rankings section or area 201 and a probability of failure section or area 203. The defect severity ranking section or area 201 can include a peak pipeline score 205, mean pipeline score 207, and mean defect score 209, which can be assigned scores as shown in FIG. 11. The peak pipeline score 205 is the highest defect score within a pipeline segment 33. The mean pipeline score 207 is the sum of the defect scores within a pipeline segment 33 divided by the length (e.g., feet) of the pipeline segment 33. The mean defect score 209 is the average of the defect scores for a pipeline segment 33, i.e., the sum of the defects divided by the number of defects in the pipeline segment 33. These three scores represent three alternative methods of reporting the structural integrity of a pipe segment 33. The defect severity ranking scores are derived from a physical inspection of the pipeline segment 33. The physical inspection, as known to those skilled in the art, is generally performed by sending a pipeline pig or camera 34 (FIG. 1) through the pipeline segment 33. A person manning a control console (not shown) observes the camera imagery and makes notes and enters data about each observed defect detected by the camera. The assessment methodology depends upon the pipeline inspection software.

Generally, however, the defects are recorded and classified according to an industry standardized scoring matrix. As such, advantageously the system 30 can obtain or otherwise receive the same ranking for the same defect from one pipeline inspection company to another using one type of equipment and software to another type of equipment and software. For example, commercially available software, such as Flexidata™, utilizes a standardized set of inspection and reporting criteria, i.e., a 2 inch diameter hole in the pipe wall will be assigned a defect score of 3 out of a possible 4 points. Three associated databases are developed based upon the scores of the defects within a pipeline segment 33. The structural defect score that is input into a pipeline defect severity score determiner 211 (FIG. 3) of the pipeline management program product 101 can be from one of three reporting databases. Generally the same database will be utilized throughout a pipeline project to reduce complexity.

Advantageously, the different defect severity ranking scores can provide for analyzing risk scores used in the risk algorithm, described later, according to three corresponding defect score methods. That is, the defect severity rankings or score 205, 207, 209, can allow the project management client entity to tailor the risk algorithm according to individual importance of these three components.

As shown in FIGS. 10 and 12-16, the probability of failure section 203 can include user selectable input fields used to select predetermined point values within predetermined point ranges (see, e.g., FIG. 12) associated with user selectable attributes such as, for example, pipeline age 211 (FIG. 13), pipeline construction material 213 (FIG. 14), pipeline depth, cover, and loading 215 (FIG. 15) including depth of bury, pipeline surrounding cover material, pipeline loading weight, for steel, concrete, PVC or clay pipe, and repair history 217 (FIG. 16) of the pipeline segment 33. The input fields, for example, can be in the form of drop-down menus each having preselected standardized categories, point ranges, and values, as illustrated. Further, according to the preferred embodiment of the present invention, the input fields are standardized in accordance with consultation with industry representatives and industry-specific pipeline failure test data, but can be individually tailored to the specific pipeline management client entity along with specific experience/failure test data to be used in the risk algorithm. In response to user selection, the individual scores are determined by a pipeline failure probability determiner 219 (FIG. 3) of the pipeline management program product 101, to thereby determine a probability of failure score for the pipeline segment 33.

As perhaps best shown in FIG. 17, the impact analysis tab 187 can include an impact analysis section which can be used to determine a score value related to an expected impact if the pipeline segment 33 fails or has failed. The impact analysis section can include user selectable input fields used to select predetermined point values within predetermined point ranges (see, e.g., FIG. 18) associated with user selectable attributes such as, for example, pipeline management client entity employees 221 (FIG. 19), impact to pipeline management client entity operations 223 (FIG. 20), impact to offsite persons 229 (FIG. 23), impact to offsite residential areas 231 (FIG. 24), impact to offsite organizations 233 (FIG. 25), onsite soil, groundwater, or surface water contamination 225 (FIG. 21), offsite soil, groundwater, or surface water contamination 235 (FIG. 26), violation of air pollution permit limits 227 (FIG. 22), violation of local, state, or federal environmental regulations 237 (FIG. 27), resulting from failure of the pipeline segment 33. The point values are assigned or otherwise associated therewith in response to user selection of predetermined criteria describing the resulting or actual impact of such failure. As with the probability of failure input fields, the impact analysis input fields, for example, can be in the form of drop-down menus each having preselected standardized categories, point ranges, and values, as illustrated. Further, according to the preferred embodiment of the present invention, the input fields are standardized in accordance with consultation with industry representatives and industry-specific pipeline impact test (experience) data, but can be individually tailored to the specific pipeline management client entity along with specific experience/impact test data to be used in the risk algorithm. In response to user selection, the individual scores are determined by a pipeline impact probability determiner 239 (FIG. 3) of the pipeline management program product 101, to thereby determine an impact of failure score for the pipeline segment 33.

As perhaps best shown in FIG. 28, the repair cost tab 189 can include a repair area or section 241 and a total cost display or input field 243 along with an associated total sections button 245. The repair section or area 241 describes an identified repair section of the pipeline segment 33 to provide an estimated cost of repairing defects discovered in the pipeline segment 33. The repair section 241 can include user selectable input/output fields having multiple categories including, for example, pipeline diameter 247, pipeline material 249, cover material 251, depth of bury 253, length of area to be repaired 255, and section cost 257, each having a variable score and/or cost value (see FIG. 29), which can be linked to a separate table/matrix (not shown) assigning scores or values to the respective point range/values illustrated in the table, to provide a current cost, for example, according to local labor, materials, and regulations. The repair section 241 can also include an estimate button 259 to allow access of the data linked to the separate table/matrix data which can be output into section cost estimate field 257. Alternatively, section cost estimate field 257 allows for direct manual entry of the cost of repairing a particular section, for example, communicated from an operator experienced in repairs and/or local cost conditions. Advantageously, such functionality provided by the section cost estimate field 257 allows the project management client entity to estimate repair costs based upon the repair methodology utilized by the project management client entity and based upon operator/analyst experience in response to the observed size and number of defects in a given pipeline segment 33 along with available databases known to those skilled in the art. For example, if the pipeline segment has multiple defects, it may be more cost-effective to replace an entire section than replace individual pieces of a section or of a segment 33. Also for example, it may be more cost-effective or efficient to replace sections of the pipeline segment 33 even if the defect is due to a relatively small hole because the cost of labor plus materials to patch the hole may exceed the cost of labor plus materials for replacing an entire, e.g., three or five foot section.

An add segment button 261 is provided to allow the user to add sections of the pipeline segment 33 requiring repair, and a set of navigation buttons 263 are provided to allow scrolling between each entered section, thereby displaying the data previously entered in the respective repair section fields. In response to user selection/data entry in the respective repair section fields and selection of the total sections button 245, the total estimate for repairing the pipeline segment 33 can be determined by a repair cost determiner 265 (FIG. 3) of the pipeline management program product 101.

Upon completion of entry of data in the segment data, risk factors, impact analysis, and repair cost tabs 183, 185, 187, and 189, the user can select the return to projects button 267 to return to the projects screen 131 (FIG. 6) for the displayed pipeline management client entity. Further, data entry completion can be indicated by a data entry complete check field 269 for the pipeline segment 33 displayed in the segment code field 271 (see, e.g., FIG. 28). As described previously, selecting the project summary button 143 (FIG. 6) on the projects screen 131 can allow the project reports manager 147 (FIG. 3) to cause display of the projects summary screen 145 (FIG. 7) having segment summary data for each of the newly and previously entered pipeline segment 33 for the selected project.

Advantageously, providing the project summary screen 145 allows the user to readily determine if data entry is complete to perform a project analysis on the data. Accordingly, the project summary screen 145 can include a visual indication of whether the data entry for each respective pipeline segment 33 is complete and whether the user has indicated the respective pipeline segment 33 to be scheduled for repair. The purpose of the project summary screen 145 can be, for example, to display data pertinent to each pipeline segment 33 of the respective project including the data used to calculate the project risk factors. Note, according to embodiment of the present invention, the data fields for each project segment 33 are not editable. According to another embodiment of the present invention, only the entry complete and schedule repair check fields 273, 275, are editable. Additionally, using the view report button 149, the user can view the data in a printable report format.

The user can then return to the client project screen 131 (FIG. 6) by selecting, for example, the return button 277. On the client project screen 131, the user can select the project analysis button 151 which can cause the project data record manager 133 (FIG. 3) to provide or otherwise cause the display of a project analysis screen 301 (FIG. 30) to thereby allow the user to sort and allocate budget, review estimated segment cost of repair, determine risk of failure of each respective pipeline segment 33 due to observed defects in the pipeline segment 33, determine a repair value for each of the project pipeline segments 33, and compare relative values of cost, risk, percent of risk, and repair value between each of the project pipeline segment 33. Advantageously, such functionality allows a user to select between pipeline structure rehabilitation alternatives according to the needs of the pipeline management client entity.

Figure 30:
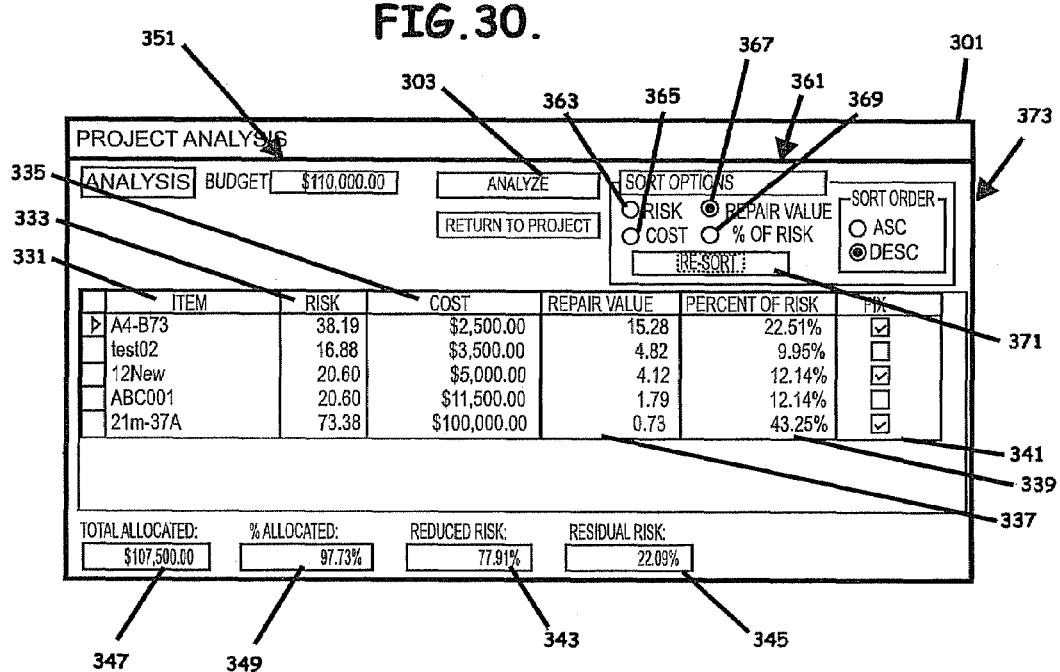
FIG. 30 is a schematic diagram of a graphical user interface for a pipeline management program product according to an embodiment of the present invention.

As shown in FIG. 30, according to an embodiment of the present invention, the project analysis screen 301 can include an analyze button 303 which can cause to be executed various functions within the pipeline management program product 101 (FIG. 3) including a risk determiner 305, repair cost-effectiveness valuator 307, risk percentage determiner 309, repair selector 311, risk reduction determiner 313, budget determiner 315, and budget indicator 317. The risk determiner 305, can determine a comparative segment risk related to each of the pipeline segments 33 listed in the pipeline segment or "item" section or area 331 (FIG. 30) in response to a selected determined defect severity ranking/score according to a selected defect score method, determined probability of failure ranking/score, and determined impact of failure ranking/score for the pipeline segment 33, and in response to the user provided defect severity weights, probability of failure weights, and impact of failure weights, described previously. Advantageously, such combination of performance grades and weighting aid the user in prioritizing the pipeline segments 33 the need renovation.

The risk displayed in the risk section or area 333 is the calculated/determined risk of failure due to defects observed in the respective pipeline segment 33 of each respective pipeline segment 33 of the selected project. The risk determiner 305 uses a scoring or risk algorithm to provide, for example, a standardized, normalized, consistent method of establishing the comparative risk factor of each pipe segment 33 of each pipeline project for each project management client entity. The weight of each of the three variable categories, severity of defects, probability of failure and impact of failure (FIGS. 10 and 17), can be chosen in consultation with the project management client entity in a manner that reflects the client entity's risk tolerances and priorities, such that the results can be incorporated into a capital improvement program.

According to an embodiment of the present invention, the following risk algorithm is used to calculate a pipeline segment risk score for each pipeline segment 33:

$$\text{Segment risk score} = \frac{(\text{Defect severity score} \times A)}{100} + \frac{(\text{Probability of failure score} \times B)}{400} + \frac{(\text{Impact of failure score} \times C)}{900},$$

where, A equals the weighting factor or score weight for defect severity 163, B equals the weighting factor or score weight for probability of failure, and C equals the weighting factor or score weight for impact of failure 167, selected in the defect weight section 121 (FIG. 5) with the sum of the score weights A, B, and C set to total 100. According to this embodiment of the present invention, the maximum score in each of the three variable categories is the pertinent divisor. That is, dividing by the maximum point score available for each variable category normalizes the scores. Further, according to this embodiment of the present invention, the values of the score weights and risk factors are selected so that the scale range of the segment risk or is between zero to one hundred.

According to an embodiment of the present invention, the defect severity score, i.e., peak pipeline score 205, mean pipeline score 207, or mean defect score 209 (FIG. 10), utilized by the risk algorithm is selected on the defect score method drop-down menu 321 (FIG. 6) and can be provided through import from standard industry software or readable data files such as, for example, an Excel spreadsheet. The probability of failure score is calculated or otherwise determined using the data entered or otherwise selected in the risk factors tab 185 (FIG. 10) of the project segment screen 181 using the data scores provided in the probability of failure tables (FIGS. 12-16). The impact of failure score is calculated or otherwise determined using the data entered or otherwise selected in the impact analysis tab 187 (FIG. 17) using the data scores provided in the impact of failure tables (FIGS. 18-27).

For example, a 100 feet long pipeline segment 33 has a fairly severe crack, for example, having a score of 50. If peak pipeline score 205 was selected as the defect score method for use by the risk algorithm, the defect severity score entered in the algorithm would be a 50. Assuming a second defect were found in the pipeline segment 33 having a score of 10 and the mean defect score 209 was selected as the defect score method for use by the risk algorithm, the defect severity score entered in the algorithm would be a 30. If the mean pipeline score 207 was selected as the defect score method for use by the risk algorithm, the defect severity score entered in the algorithm would be a 0.6.

According to an embodiment of the present invention, if any individual item scores of the subcategories of the criteria listed in the probability of failure primary criteria shown in FIG. 12 is determined to be maximum, i.e., 100, the value for probability of failure can be automatically set to maximum, i.e., 400, to elevate the importance of the probability of failure variable category. Further, if any individual item scores of the subcategories of the criteria listed in the impact of failure primary criteria shown in FIG. 18 is determined to be maximum, i.e., 100, the value for impact of failure can be automatically set to maximum, i.e., 900, to elevate the importance of the impact of failure variable category.

Advantageously, the user is provided the choice of defect severity score to be used in determining the segment risk score for each pipeline segment 33. For example, if the pipeline structure 31 is in relatively good condition, and the owning entity has very limited funds, the entity may prefer performing point repairs to solve any individual discovered defect issues. Thus, the entity would be interested in the peak pipeline score 205 for each pipeline segment 33. Alternatively, if the pipeline structure 31 is in relatively poor condition such that point repairs will be ineffective due to a large number of defects in a given pipeline segment 33, thus requiring replacing either entire pipeline segments or physically distinct segments thereof, the entity would likely be more interested in the mean/average pipeline score 207 or mean/average defect score 209 for each pipeline sector 33. Two illustrations of a calculation of a segment risk score for a pipeline segment 33 illustrating the use of different defect score methods are illustrated below.

Illustration 1 provides an example segment risk score calculation whereby the user has selected the peak pipeline defect score method as the defect score method and has deemed impact of failure as being three times as important as defect severity or probability of failure. That is, assuming a defect severity score, i.e., peak pipeline score 205 is calculated or otherwise determined to equal 50, the probability of failure score is determined to equal 75, and the impact of failure score is determined to equal 100, and the defect severity, probability of failure, and impact of failure score weights are selected to be 20, 20, and 60, respectively, the segment risk score would be determined as follows:

$$\text{Segment Risk Score} = \frac{(50 \times 20)}{100} + \frac{(75 \times 20)}{400} + \frac{(500 \times 60)}{900} = 47.08$$

Illustration 2 provides an example segment risk score calculation whereby the user has also selected the peak pipeline defect score method as the defect score method but has instead deemed probability of failure as being twice as important as defect severity or impact of failure. That is, assuming a defect severity score, i.e., peak pipeline score 205 is calculated or otherwise determined to equal 50, the probability of failure score is determined to equal 75, and the impact of failure score is determined to equal 100, and the defect severity, probability of failure, and impact of failure score weights are selected to be 25, 50, and 25, respectively, the segment risk score would be determined as follows:

$$\text{Segment Risk Score} = \frac{(50 \times 25)}{100} + \frac{(75 \times 50)}{400} + \frac{(500 \times 25)}{900} = 24.65$$

According to an embodiment of the present invention, the risk algorithm calculations used to reach the segment risk score, e.g., scoring values, weighing factors, normalizing factor, and format of the algorithm, can be adjusted to reach a pipeline management client entity desired comparative risk output. Further, according to another embodiment of the present invention, upset limits can be provided that automatically trigger maximum combined scoring as well as maximum individual category scoring. For example, if the impact analysis indicates that the probability of failure is high and the impact of failure will result in a shut down of the client entity facility or plant, or will result in an evacuation of an adjacent neighborhood, system 30 can be set to provide the respective pipeline segment 33 a combined score of 100 to elevate the importance of the respective pipeline segment 33.

As also shown in FIG. 30, according to an embodiment of the present invention, the repair cost-effectiveness valuator 337 also in response to selection of the analyze button 303 can establish a comparative segment risk valuation for each pipeline segment 33 using as input the respective estimated repair cost or "cost" shown in section or area 335 determined or otherwise calculated using data entered utilizing the repair cost tab 189 (FIG. 28), and using as input the respective determined segment risk score or "risk" shown in section or area 335. The comparative segment risk valuation can be displayed in the repair value section or area 337 to allow the user to readily determine which pipeline segments 33 are most cost-effective to repair or alternatively to determine which segments are least cost-effective to repair. According to an embodiment of the present invention, the comparative segment risk valuation or "repair value" is determined according to the following algorithm:

$$\text{Repair value} = \frac{\text{Segment risk score} \times 1000}{\text{Estimated repair cost}}$$

Although, intuitive when a project includes a relatively small number of pipeline segments 33, this feature is extremely desirable when the project includes hundreds or even thousands of pipeline segments 33 and due to fiscal constraints, decisions must be made on which pipeline segments 33 to repair first.

According to an embodiment of the present invention, the risk percentage determiner 309, also in response to selection of the analyze button 303, can determine a relative risk percentage of each of the plurality of pipeline segments 33 with respect to the sum total of the risks of each displayed pipeline segment 33 using as input the respective segment risk score and the sum total of the segment risk scores to perform the respective calculation for each of the displayed segments 33. The determined risk percentage or "percentage-of-risk" can be displayed in the percent-of-risk section or area 339 to allow for comparison of the percentage or risk between displayed pipeline segments 33.

According to an embodiment of the present invention, the repair selector 311 in response to user input/selection, for example, of the input check fields shown in the fix section or area 341, can indicate repair selection of the plurality of pipeline segments selected for repair to thereby perform a risk reduction and budgetary analysis on the selected pipeline segments 33. Accordingly, the risk reduction determiner 313, using as input the determined relative risk or risk percentage and repair selection for each of the displayed pipeline segments 33 and in response to selection of the analyze button 303, can determine a total reduced risk percentage or "reduced risk" defined, for example, by a sum of the risk percentages for the displayed pipeline segments 33 selected for repair. The reduced risk can be displayed in the reduced risk output field 343. The risk reduction determiner 313 can also, correspondingly, determine a residual risk percentage defined by a sum of the risk percentages for the pipeline segments remaining unselected for repair, which can be displayed in the residual risk output field 345. Alternatively, although somewhat less intuitive to the user, the risk reduction determiner 313, can use segment risk and repair selection for each of the displayed pipeline segments 33 to determine a total reduced risk defined by a sum of the segment risk for each pipeline segment selected for repair and to determine a residual risk defined by a sum of the risk for pipeline segments remaining unselected for repair. In this embodiment, the reduced and residual risk can be displayed as raw scores in the respective output fields 343, 345, rather than as percentages of the total project risk.

According to an embodiment of the present invention, the budget determiner 315 also in response to user selection of the analyze button 303 and using as input the total available budget defined by the user in budget field 347 and the estimated repair costs for each of the plurality of selected pipeline segments 33 shown in section or area 335 can determine a total allocated budget defined by the sum of the estimated repair costs for each of the plurality of pipeline segments selected for repair. The total allocated budget can be shown in output field 347. The budget determiner 315 can also determine a percent allocated budget shown in output field 349 defined by the percentage of the total allocated budget relative to the total available budget shown in budget field 351.

Figure 31:
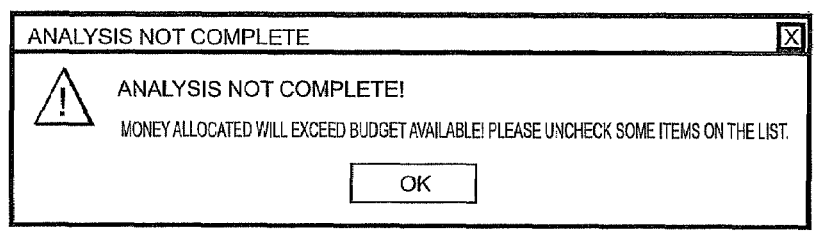
FIG. 31 is a schematic diagram of a graphical user interface for a pipeline management program product according to an embodiment of the present invention.

As shown, for example, in FIG. 31, the budget indicator 317, using as input the determined percentage of total allocated budget relative to total available budget, can indicate to the user when the total allocated budget exceeds the total available budget. Advantageously, this allows the user to rethink/reanalyze the selection of which pipeline segments 33 should be indicated for repair according to the current total budget or to provide justification to request additional budgetary funds.

As shown in FIG. 30, the project analysis screen 301 can also include a sort options section or area 361 including a risk input check field 363, cost input check field 365, repair value input check field 367, percentage of risk input check field 369 and a re-sort button 371 which can allow a user to select sorting the pipeline segments, risk, cost, repair value, or percent-of-risk to thereby perform an individual visual analysis on the output data. The sort options section or area 361 can also include a sort order section or area 373 input check field or fields to allow sorting the listed items in ascending or descending order. Advantageously, this functionality allows the user to readily view data for each individual pipeline segment 33 and to readily view which pipeline segments 33 have the highest or lowest risk, cost, repair value (cost effectiveness), and/or percentage of risk. In conjunction with dysfunction, the user can typically select or deselect segments to repair and "click" the analyze button 303 to select varying contingencies or scenarios for performing repairs, analyzing risk reduction and budget consumption.

Embodiments of the present invention also include methods to perform the foregoing functions to manage and analyze conditions of pipeline structures. According to an embodiment of the present invention, a method can include first establishing a client entity data record 47 for each client entity utilizing a computer and/or server, e.g. computer 61, 71, and establishing one or more pipeline project data records 45 associated with each respective client entity. For each pipeline project, the method further includes defining a pipeline structure 31 by adding pipeline segments 33 to the project record 45, if not already done so, to analyze the risk, cost, and/or cost-effectiveness of individual pipeline segment repairs. For illustrative purposes, the following generally describes steps that can be used to add pipeline segments 33 to a pipeline structure 31 and analyze the pipeline structure 31 to determine risk posed by a pipeline segments 33 having defects, the cost of repair, and the cost-effectiveness of performing such repair, along with fiscal management of such a repair project. The steps required to add multiple pipeline segments 33 are substantially similar, and thus, generally only a single pipeline segment 33 will be referred to with respect to adding a pipeline segment 33.

Figure 32A:
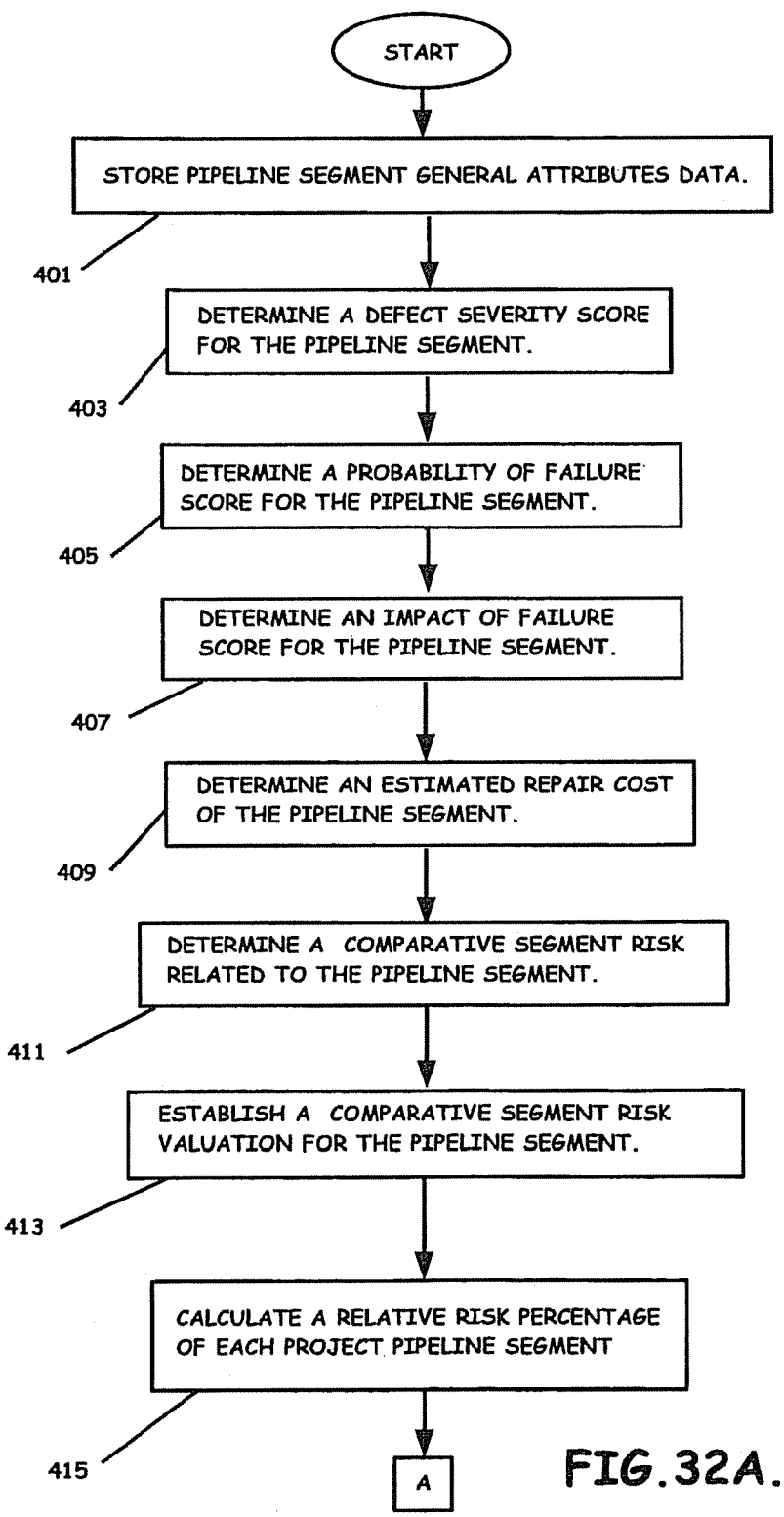
FIGS. 32A-B is a block flow diagram illustrating a method of managing and analyzing conditions of a pipeline structure according to an embodiment of the present invention.
Figure 32B:
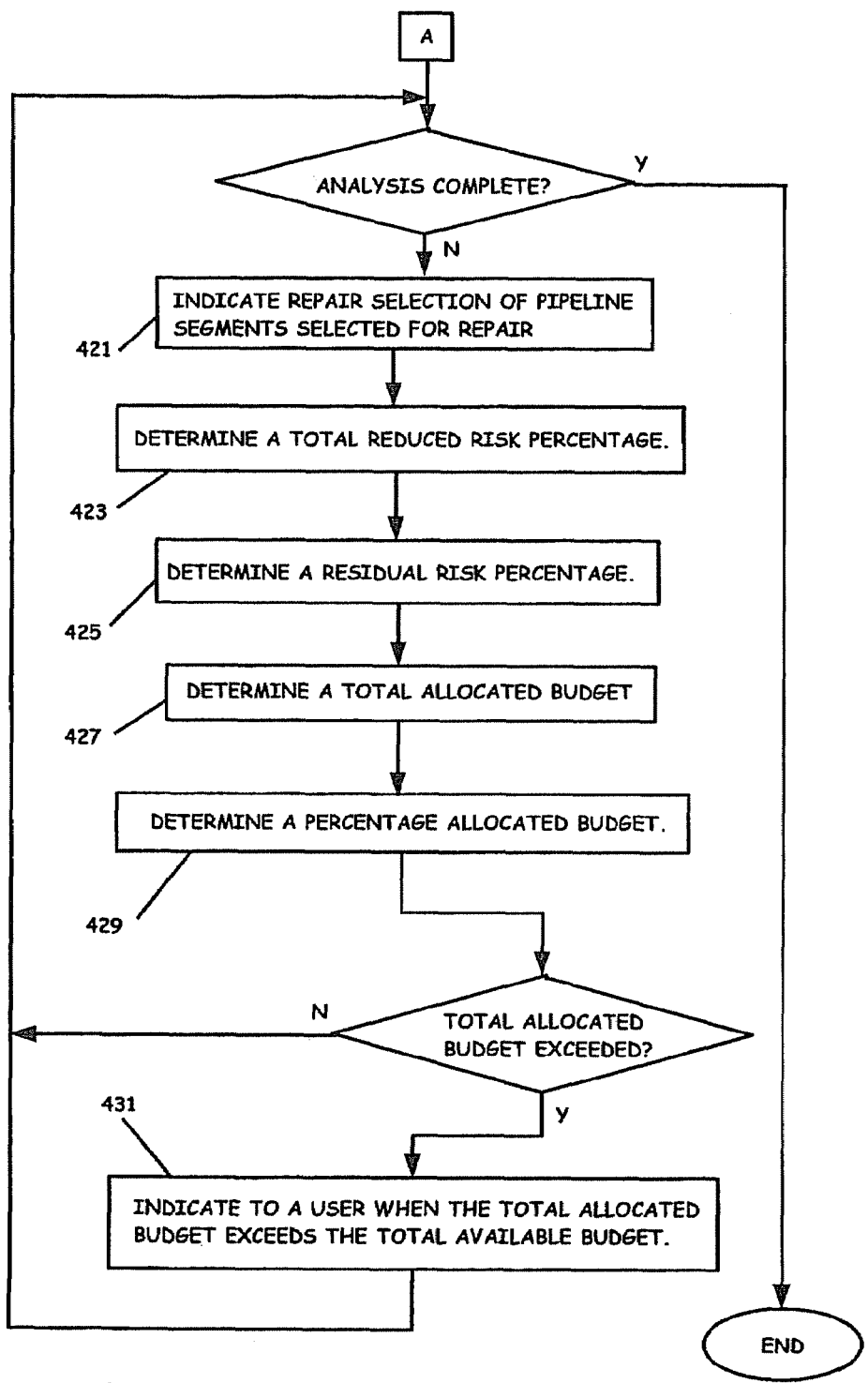
Figure 33A:
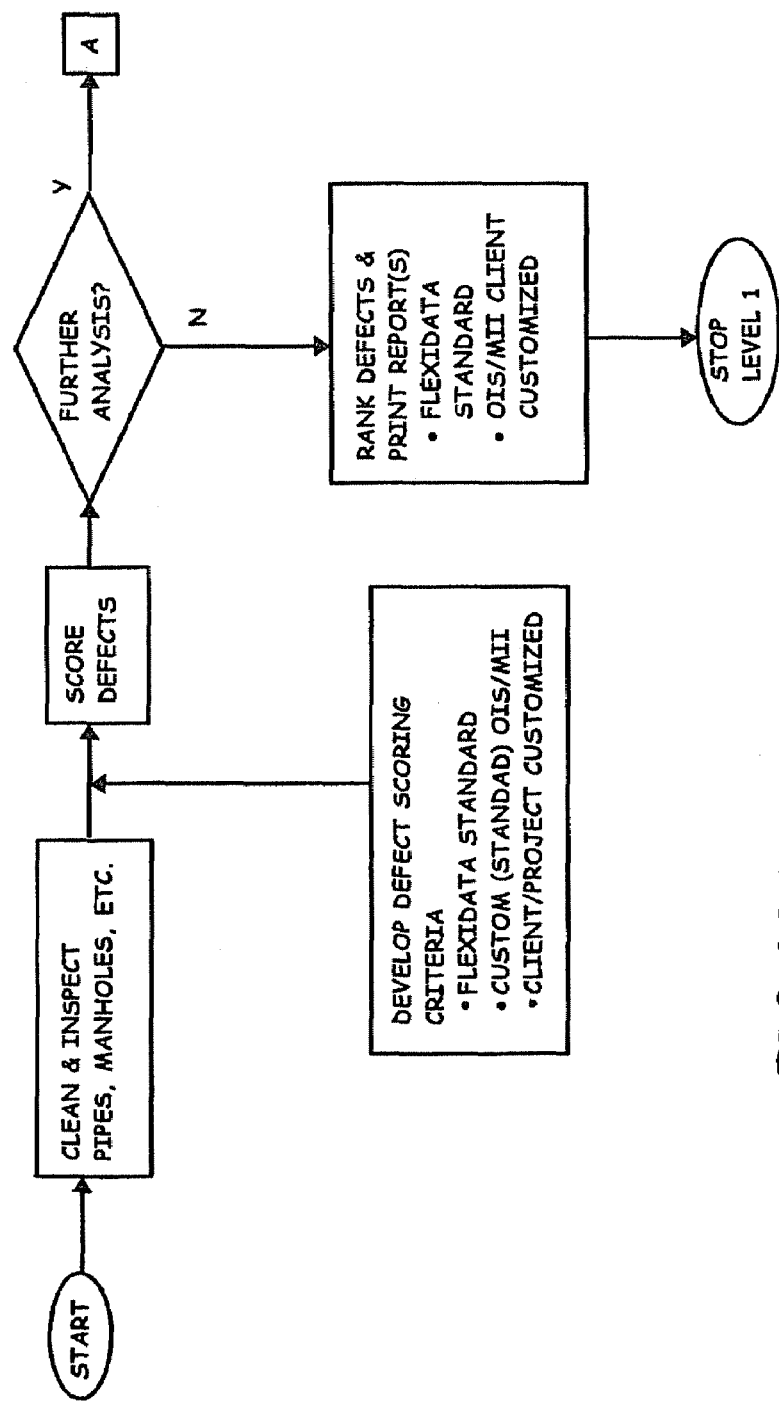
FIGS. 33A-B is a high-level block flow diagram illustrating a method of managing and analyzing conditions of a pipeline structure according to an embodiment of the present invention.
Figure 33B:
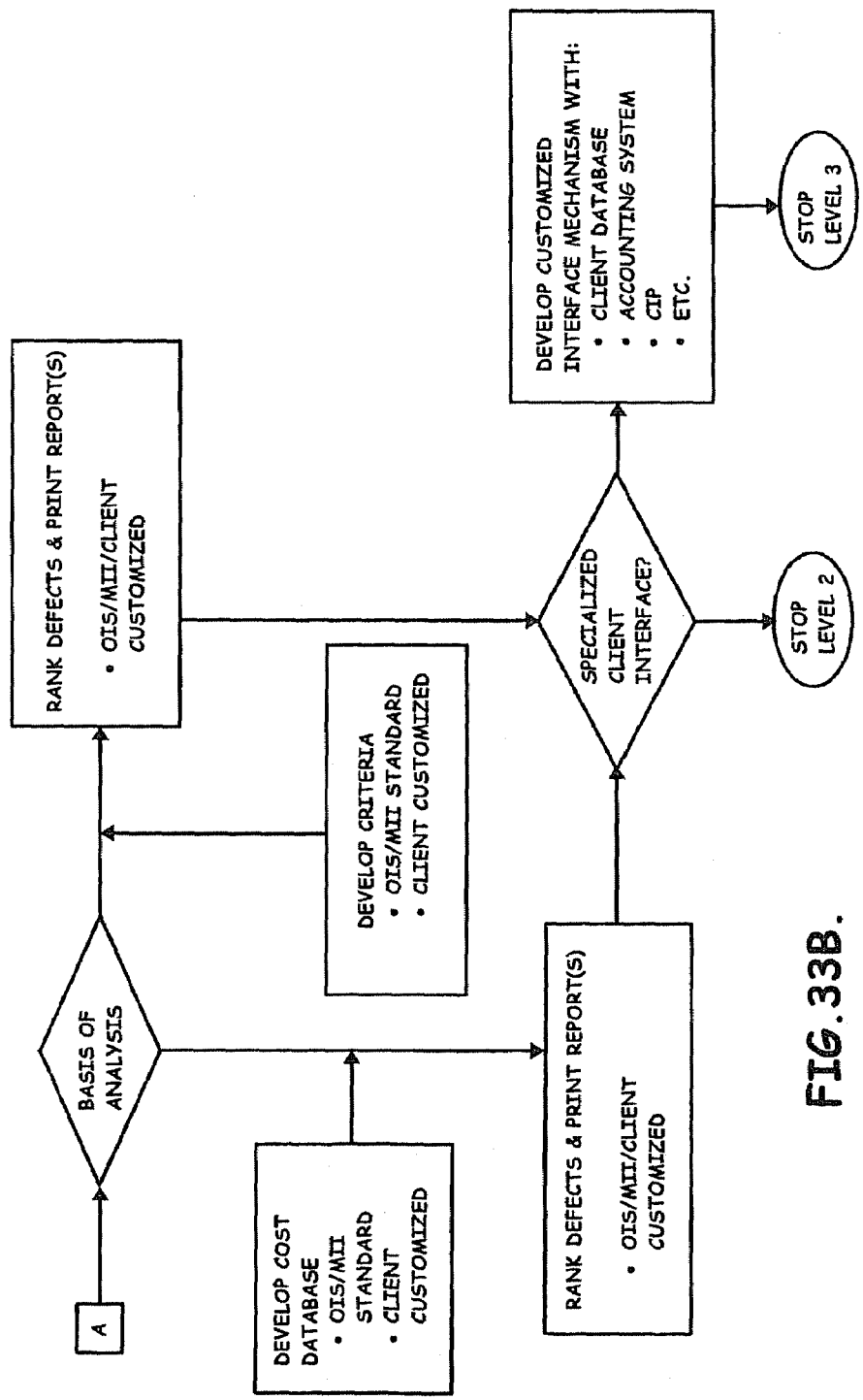
Figure 34:
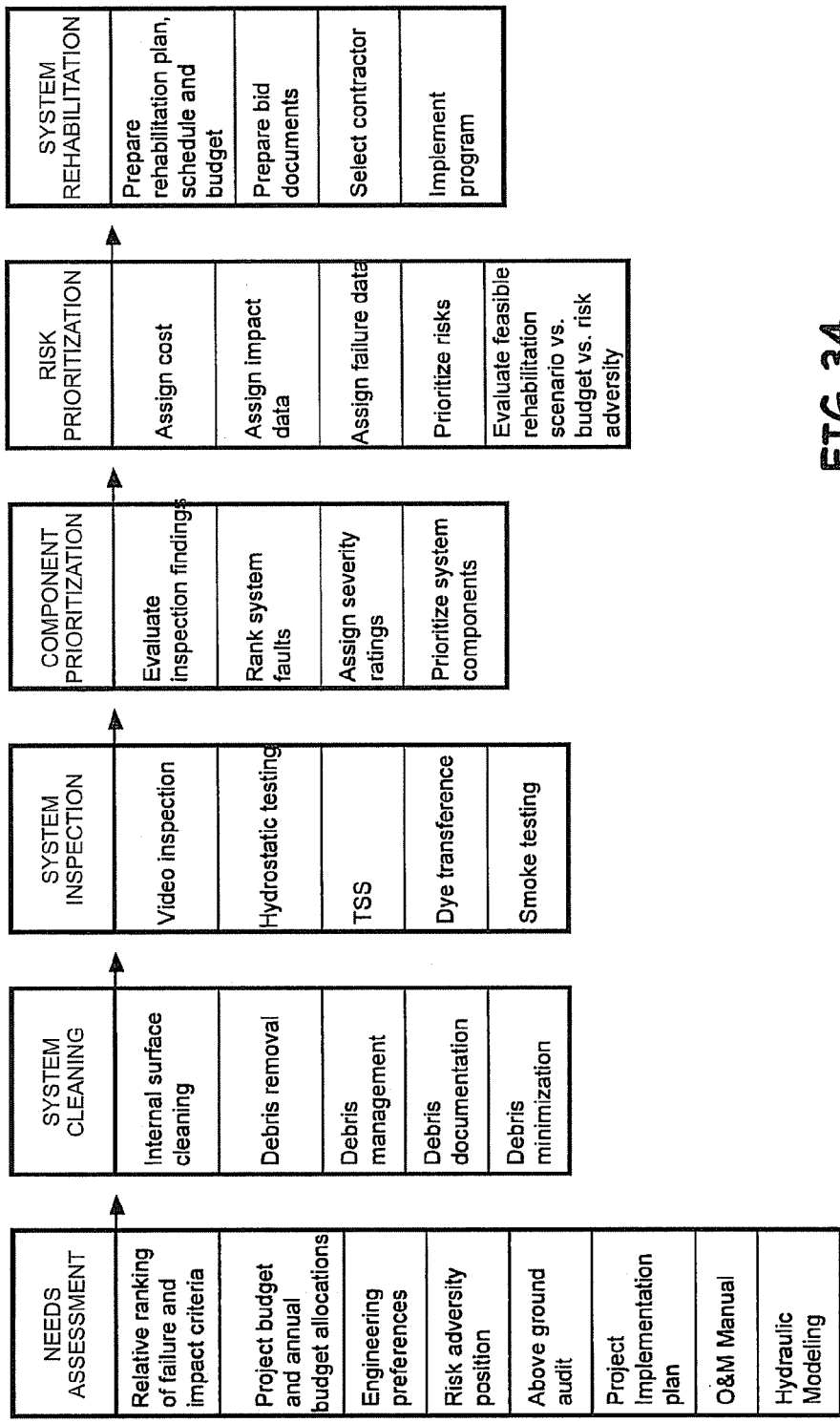
FIG. 34 is a schematic diagram of pipeline structure rehabilitation system according to an embodiment of the present invention.

As shown in FIGS. 32A-B, according to an embodiment of the present invention, the method can include storing pipeline segment general attributes data related to a pipeline segment 33 associated with a pipeline project in a database (block 401), and determining at least one defect severity score (block 403) for the pipeline segment 33 using pipeline defect data related to the pipeline segment 33, i.e., determined structural defects in the pipeline segment 33 using for example, a camera or pipeline pig 34 and industry standard ranking for such structural defects. The pipeline segment general attributes data can include, for example, a pipeline segment diameter, a pipeline material, a segment length, an upstream manhole location, a downstream manhole location, a percentage slope of the pipeline segment, and others known to those skilled in the art. The defect severity scores can include those for a peak defect score for the respective pipeline segment 33, the average defect score for the respective pipeline segment 33, and the average defect score per unit measure of the pipeline segment 33.

The method can also include determining a probability of failure score for the pipeline segment 33 (block 405) responsive to pipeline specific attribute data related to the pipeline segment 33 and probability of pipeline failure test data, and determining an impact of failure score for the pipeline segment 33 (block 407) responsive to selected failure impact data related to the pipeline segment 33 and pipeline failure impact test data. According to an embodiment of the present invention, the probability of pipeline failure test data includes tabular data indicating, for example, a score for a pipeline age, a pipeline construction material, a pipeline depth of bury, a pipeline surrounding cover material, a pipeline loading weight, and a repair history of the pipeline segment. The pipeline failure impact test data includes tabular data indicating, for example, a score for impact to pipeline management client entity employees, impact to pipeline management client entity operations, impact to offsite persons, impact to offsite residential areas, impact to offsite organizations, onsite soil contamination, offsite soil contamination, onsite groundwater contamination, offsite groundwater contamination, onsite surface water contamination, offsite surface water contamination, violation of air pollution permit limits, violation of local environmental regulations, violation of state environmental regulations, and violation of federal environmental regulations resulting from failure of the pipeline segment. The method can also include determining an estimated repair cost of the pipeline segment 33 (block 409) responsive to pipeline repair section data related to each determined sectional defect in the pipeline segment 33, a selected defect repair method, e.g., point repair verses segment or section replacement, and repair cost data determined through analyst experience and industry tabular data.

According to an embodiment of the present invention, the method includes determining a comparative segment risk (block 411) related to each pipeline segment 33 of the pipeline structure 31 responsive to a selected one of the determined defect severity scores, the determined probability of failure score, the determined impact of failure score, and user provided defect severity weight, probability of failure weight, and impact of failure weight. Advantageously, the comparative segment risk allows a user to compare a risk of failure of the pipeline segment 33 due to observed defects with respect to the other pipeline segments 33 of pipeline structure 31, enhancing pipeline risk management. The method can also include establishing a comparative segment risk valuation for the pipeline segments 33 (block 413) responsive to the estimated repair cost and the determined segment risk, to provide the user with a relative percentage of risk of each of the pipeline segments 33 with respect to the other pipeline segments 33 of the pipeline structure 31, to further enhance pipeline risk management. The method can further include calculating a relative risk percentage of the pipeline segments 33 with respect to each of the other pipeline segments 33 of the pipeline structure 31 (block 415) responsive to the determined segment risk.

The method also includes performing the following steps iteratively until the analysis is complete. That is, the method includes selecting one or more of the pipeline segments 33 for repair (block 421), determining a total reduced risk percentage (block 423) defined as a sum of the risk percentages for pipeline segments 33 selected for repair responsive to the calculated relative risk percentage and repair selection for each of the pipeline segments 33, and determining a residual risk percentage (block 425) defined as a sum of the risk percentages for the pipeline segments 33 remaining unselected for repair responsive to the calculated relative risk percentage and repair selection for each of the pipeline segments 33.

The method can further include determining a total allocated budget (block 427) defined as the sum of the determined repair costs for each of the pipeline segments 33 selected for repair responsive to the determined repair cost and repair selection of the pipeline segments 33, determining a percent allocated budget (block 429) defined as the percentage of the total allocated budget relative to the total available budget responsive to a total available budget and a total available budget to thereby enhance pipeline repair cost management, and indicating to a user when the total allocated budget exceeds the total available budget (block 431) if so exceeded.

It is important to note that while embodiments of the present invention have been described in the context of a fully functional system, those skilled in the art will appreciate that the mechanism of the present invention and/or aspects thereof are capable of being distributed in the form of a computer readable medium of instructions in a variety of forms for execution on a processor, processors, or the like, and that the present invention applies equally regardless of the particular type of signal bearing media used to actually carry out the distribution. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links. For example, such media can include both operating instructions and instructions related to the pipeline management program product 101 described above and much of the method steps described below.

As shown in FIGS. 1-34, embodiments of the present invention can include and incorporate a computer readable medium that includes instructions to perform the foregoing functions to manage and analyze conditions of pipeline structures. Particularly, embodiments of the present invention can include a computer readable medium that is readable by a computer to manage and analyze conditions of a pipeline structure as described above, particularly with respect to the program product and the computer executable method steps, described above. For example, according to an embodiment of the present invention, a computer readable medium that is readable by a computer to manage and analyze conditions of a pipeline structure 31 can include a set of instructions that, when executed by the computer, cause the computer to receive data indicating one or more pipeline management client entity, receive data indicating at least one but preferably a plurality of pipeline repair projects, and to associate each pipeline repair projects with a pipeline management client entity. The instructions can also include those to perform the operations of defining a pipeline structure 31 by adding pipeline segments 33 to the project record 45, if not already done so, to analyze the risk, cost, and/or cost-effectiveness of individual pipeline segment repairs.

According to an embodiment of the present invention, a computer readable medium can include instructions to perform the operations of storing pipeline segment general attributes data related to a pipeline segment 33 associated with a pipeline project in a database, and determining at least one defect severity score for the pipeline segment 33 using pipeline defect data related to the pipeline segment 33, i.e., determined structural defects in the pipeline segment 33 received from an external software or program product including industry standard rankings data for such structural defects or received from a medium such as, for example, an Excel spreadsheet tabulating the industry standard rankings data.

The instructions can also include those to perform the operations of determining a probability of failure score for the pipeline segment 33 responsive to received pipeline specific attribute data related to the pipeline segment 33 and probability of pipeline failure test data, and determining an impact of failure score for the pipeline segment 33 responsive to received failure impact data related to the pipeline segment 33 and pipeline failure impact test data. The instructions can also include those to perform the operation of determining an estimated repair cost of the pipeline segment 33 responsive to received pipeline repair section data related to each determined sectional defect in the pipeline segment 33 and repair cost data determined through analyst experience and industry tabular data.

According to an embodiment of the present invention, the computer readable medium includes instructions to perform the operations of determining a comparative segment risk related to each pipeline segment 33 of the pipeline structure 31 using a segment risk algorithm. The segment risk algorithm, according to a preferred embodiment of the present invention, utilizes data indicating a selected one of the determined defect severity scores, the determined probability of failure score, the determined impact of failure score, and received user provided defect severity weight, probability of failure weight, and impact of failure weight, for each pipeline segment 33. Advantageously, the comparative segment risk allows a user to compare a risk of failure of the pipeline segment 33 due to observed defects with respect to the other pipeline segments 33 of pipeline structure 31, enhancing pipeline risk management.

The instructions can also include those to perform the operation of establishing a comparative segment risk valuation for each of the pipeline segments 33 responsive to the respective estimated repair cost and the respective determined segment risk, to provide the user with a relative percentage of risk of each of the pipeline segments 33 with respect to the other pipeline segments 33 of the pipeline structure 31, further enhancing pipeline risk management. The instructions can further include those to perform the operation of calculating a relative risk percentage of the pipeline segments 33 with respect to each of the other pipeline segments 33 of the pipeline structure 31 responsive to the respective determined segment risk for each pipeline segment 33.

According to an embodiment of the present invention, the computer readable medium can include instructions to perform the operations of receiving a pipeline segment repair selection status for a subset of the plurality of pipeline segments selected for repair responsive to user input, determining a total reduced risk percentage defined as a sum of the risk percentages for pipeline segments 33 selected for repair responsive to the calculated relative risk percentage and repair selection for each of the pipeline segments 33, and determining a residual risk percentage defined as a sum of the risk percentages for the pipeline segments 33 remaining unselected for repair responsive to the calculated relative risk percentage and repair selection for each of the pipeline segments 33.

The computer readable medium can further include instructions to perform the operations of determining a total allocated budget defined as the sum of the determined repair costs for each of the pipeline segments 33 selected for repair responsive to the determined repair cost and repair selection, determining a percent allocated budget responsive to a total available budget and a total available budget to thereby enhance pipeline repair cost management, and indicating to a user when the total allocated budget exceeds the total available budget, if so exceeded.

Embodiments of the present invention also include a computer memory element containing, stored in signal bearing media, a database such as database 43 (FIG. 1). The computer memory element can include but is not limited to the various volatile and non-volatile forms of memory used in conjunction with a computer or processor such as, for example, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types.

The database 43 can contain data in computer readable format indicating pipeline segment attributes of a plurality of pipeline segments 33 of a pipeline project, and data indicating a comparative segment risk for each of the plurality of pipeline segments 33 such as that shown in the segment risk section or area 333 illustrated in FIG. 30. The comparative segment risk indicates a relative risk of failure of each one of the plurality of pipeline segments 33 due to observed defects with respect to each other of the plurality of pipeline segments 33. The database 43 can also contain data indicating a comparative risk percentage of segment risk for each of the plurality of pipeline segments 33 such as that shown in the percent-of-risk section or area 339 illustrated in FIG. 30. The comparative risk percentage indicates a relative percentage of risk of failure of each one of the plurality of pipeline segments 33 with respect to each other of the plurality of pipeline segments 33. The database 43 can further include data indicating a repair selection status of a subset of the plurality of pipeline segments 33, data indicating a total reduced risk percentage defined as a sum of the segment risk percentages of the each of the plurality pipeline segments selected for repair, and data indicating a residual risk percentage defined as a sum of the segment risk percentages for each of the plurality of pipeline segments remaining unselected for repair.

According to an embodiment of the present invention, the database 43 can include data indicating a comparative segment risk valuation for each of the plurality of pipeline segments such as that shown in the repair value section or area 337 illustrated in FIG. 30. The comparative segment risk valuation indicates a relative cost-effectiveness of repairing each respective one of the plurality of pipeline segments 33 with respect to each other of the plurality of pipeline segments 33. The database 43 can also include data indicating a repair selection status of a subset of the plurality of pipeline segments 33, data indicating an estimated repair cost of each of the plurality of pipeline segments 33, data indicating a total allocated budget defined as a sum of the determined repair costs for each of the plurality of pipeline segments selected for repair, and data indicating a percent allocated budget defined as a percentage of the total allocated budget relative to a total available budget.

In the drawings and specification, there have been disclosed a typical preferred embodiment of the invention, and although specific terms are employed, the terms are used in a descriptive sense only and not for purposes of limitation, the scope of the invention being set forth in the following claims. The invention has been described in considerable detail with specific reference to these illustrated embodiments. It will be apparent, however, that various modifications and changes can be made within the spirit and scope of the invention as described in the foregoing specification.

That claimed is:

1. A system to manage and analyze conditions of pipeline structures, the system comprising:

a pipeline structure each having a plurality of pipeline segments to define a pipeline project;

a computer accessible to a communication network configured as a pipeline management computer having a processor and memory coupled to the processor to store operating instructions therein;

a pipeline management database accessible to the processor of the pipeline management computer and having database records associated with a pipeline management client entity and database records associated with at least one pipeline project related to the database records associated with a pipeline management client entity;

pipeline management program product stored in the memory of the pipeline management computer to manage and analyze pipeline projects, the pipeline management program product including:

a pipeline segment storer responsive to user input commands to store pipeline general attributes data related to a pipeline segment associated with a pipeline project, a pipeline defect severity score determiner responsive to pipeline defect data related to the pipeline segment including determined structural defects in the pipeline segment to determine a plurality of defect severity ranking scores for the pipeline segment, a pipeline failure probability determiner responsive to pipeline specific attribute data related to the pipeline segment, probability of pipeline failure test data, and user input commands, to determine a probability of failure score for the pipeline segment, a pipeline failure impact determiner responsive to selected failure impact data related to the pipeline segment, pipeline failure impact test data, and user input commands, to determine an impact of failure score for the pipeline segment, the impact of failure score being defined as quantification of expected impact of failure based on a plurality of score values each being based on at least one of a plurality of expected impact results, each of the plurality of expected impact results having a corresponding impact point number value, the expected impact of failure being at least two of on-site impact, off site impact, and pipeline project operation impact, a repair cost determiner, responsive to pipeline repair section data related to a determined sectional defect in the pipeline segments, defect repair method, repair cost data, and user input commands, to determine an estimated repair cost of the pipeline segment, and a risk determiner responsive to a selected one of the plurality of determined defect severity scores, the determined probability of failure score, and the determined impact of failure score for the pipeline segment, and responsive to a user provided defect severity weight, probability of failure weight, and impact of failure weight, to determine a comparative segment risk related to the pipeline segment, to thereby enhance pipeline risk management.

2. A system as defined in claim 1, wherein the pipeline management program product further comprises:

a repair cost effectiveness valuator responsive to the estimated repair cost and the determined segment risk to establish a comparative segment risk valuation for the pipeline segment, to thereby enhance pipeline repair cost management.

3. A system as defined in claim 1, wherein the pipeline management program product further comprises:

a risk percentage determiner responsive to the determined segment risk to determine a relative risk percentage of each of the plurality of pipeline segments;

a repair selector responsive to user input commands to indicate repair selection of each of the plurality of pipeline segments selected for repair; and a risk reduction determiner responsive to the determined relative risk percentage and the repair selection for each of the plurality of pipeline segments to determine a total reduced risk percentage defined by a sum of the risk percentages for pipeline segments selected for repair and to determine a residual risk percentage defined by a sum of the risk percentages for the pipeline segments remaining unselected for repair, to thereby enhance risk management.

4. A system as defined in claim 1, wherein the pipeline management program product further comprises:

a repair selector responsive to user input commands to indicate selection of the plurality of pipeline segments selected for repair;

a budget determiner responsive to a total available budget and estimated repair cost and repair selection for each of the plurality of pipeline segments to determine a total allocated budget defined by the sum of the estimated repair costs for each of the plurality of pipeline segments selected for repair and to determine a percent allocated budget defined by the percentage of the total allocated budget relative to the total available budget; and a budget indicator responsive to the determined percentage of total allocated budget relative to total available budget to indicate to the user when the total allocated budget exceeds the total available budget.

5. A system as defined in claim 1, wherein the pipeline management computer is configured as a pipeline management server, and wherein the pipeline management program product further comprises:

a client data record manager responsive to user input commands to manage a plurality of pipeline management client entity data records related to a plurality of pipeline management client entities; and a project data record manager responsive to the plurality of client data records and user input commands to manage project data records for a plurality of pipeline projects and to relate each project data record to one of the plurality of pipeline management client entity data records.

6. A system as defined in claim 1, wherein the pipeline general data includes at least four of the following: a pipeline segment diameter, a pipeline material, a pipeline segment length, a pipeline segment upstream manhole location, a pipeline segment downstream manhole location, and a pipeline segment slope; and wherein the pipeline defect data also includes tabular data indicating a score for a peak pipeline score, a mean pipeline score, and a mean defect score for the pipeline segment.

7. A system as defined in claim 1, wherein the probability of pipeline failure test data includes tabular data indicating a score for at least four of the following: a pipeline segment age, a pipeline segment construction material, a pipeline segment depth of bury, a pipeline segment surrounding cover material, a pipeline segment loading weight, and a pipeline segment repair history.

8. A system as defined in claim 1, wherein the pipeline failure impact test data includes tabular data indicating a score for at least four of the following: impact of failure to pipeline management client entity employees, impact of failure to pipeline management client entity operations, impact of failure to offsite persons, impact of failure to offsite residential areas, impact of failure to offsite organizations, impact of failure to onsite soil contamination, impact of failure to offsite soil contamination, impact of failure to onsite groundwater contamination, impact of failure to offsite groundwater contamination, impact of failure to onsite surface water contamination, offsite surface water contamination, impact of failure to violation of air pollution permit limits, impact of failure to violation of local environmental regulations, impact of failure to violation of state environmental regulations, and impact of failure to violation of federal environmental regulations, resulting from failure of the pipeline segment.

9. A system as defined in claim 1, wherein the repair cost data includes data indicating a cost of repair of a pipeline repair section responsive to at least three of the following: a specific section length of repair, a surrounding cover material, a depth of bury of the length of the pipeline segment, a diameter of the pipeline segment, and pipeline segment diameter.

10. A system as defined in claim 1, wherein the pipeline management computer is configured as a pipeline management server, and wherein the system further comprises:

a communication network; and at least one user computer accessible to the communication network and having a processor and memory coupled to the processor to store operating instructions therein to send pipeline data to the pipeline management server and a display in communication with the processor to display pipeline data.

11. A computer-implemented method of managing and analyzing conditions of pipeline structures, the method comprising the steps of:

storing pipeline segment general attributes data related to a pipeline segment associated with a pipeline project in a database associated with and in communication with a pipeline management computer configured as a pipeline management server;

determining in a first computer process a defect severity score for the pipeline segment by the pipeline management server responsive to pipeline defect data related to the pipeline segment, the pipeline defect data including determined structural defects in the pipeline segment and an industry standard ranking of structural defects;

determining in a second computer process a probability of failure score for the pipeline segment by the pipeline management server responsive to pipeline specific attribute data related to the pipeline segment and probability of pipeline failure test data stored in the database;

determining in a third computer process an impact of failure score for the pipeline segment by the pipeline management server responsive to selected failure impact data related to the pipeline segment and pipeline failure impact test data, the impact of failure score defined as quantification of expected impact of failure based on a plurality of score values each being based on at least one of a plurality of expected impact results, each of the plurality of expected impact results having a corresponding impact point value, the expected impact of failure being at least two of on-site impact, off-site impact, and pipeline project operation impact;

determining in a fourth computer process an estimated repair cost of the pipeline segment by the pipeline management server responsive to pipeline repair section data related to a determined sectional defect in the pipeline segment, and repair cost data; and determining in a fifth computer process a comparative segment risk related to the pipeline segment by the pipeline management server responsive to the determined defect severity score from the first computer process, the determined probability of failure score from the second computer process, the determined impact of failure score from the third computer process, and a user provided defect severity weight, probability of failure weight, and impact of failure weight, to thereby enhance pipeline risk management.

12. A computer-implemented method as defined in claim 11, the method further comprising the step of:

establishing in a sixth computer process a comparative segment risk valuation for the pipeline segment by the pipeline management server responsive to the estimated repair cost from the fourth computer process and the determined segment risk from the fifth computer process, to thereby enhance pipeline repair cost management.

13. A computer-implemented method as defined in claim 11, the method further comprising the steps of:

calculating in a seventh computer process a relative segment risk percentage of each of a plurality of pipeline segments by the pipeline management server responsive to the determined segment risk from the fifth computer process;

selecting a subset of the plurality of pipeline segments for repair;

determining in an eighth computer process a total reduced risk percentage by the pipeline management server responsive to the calculated relative segment risk percentage from the seventh computer process and repair selection, the total reduced risk percentage defined as a sum of the segment risk percentages for the pipeline segments selected for repair; and determining in a ninth computer process a residual risk percentage, defined as a sum of the risk percentages for the pipeline segments remaining unselected for repair, by the pipeline management server responsive to the calculated relative risk percentage from the seventh computer process and repair selection for each of the plurality of pipeline segments, to thereby enhance risk management.

14. A computer-implemented method as defined in claim 11, the method further comprising the steps of:

selecting a subset of the plurality of pipeline segments for repair;

determining in a tenth computer process a total allocated budget by the pipeline management server responsive to the determined repair cost from the fourth computer process and the repair selection, the total allocated budget defined as the sum of the determined repair costs for each of the plurality of pipeline segments selected for repair;

determining in an eleventh computer process a percent allocated budget by the pipeline management server responsive to the total allocated budget from the tenth computer process and a total available budget to thereby enhance pipeline repair cost management, the percent allocated budget defined as the percentage of the total allocated budget relative to the total available budget; and indicating by the pipeline management server to a user when the total allocated budget exceeds the total available budget.

15. A computer-implemented method as defined in claim 11, wherein the step of determining a defect severity score for the pipeline segment includes the step of selecting a defect score method from one of the following pipeline scoring methods: peak pipeline score, mean pipeline score, and mean defect score;

wherein the pipeline management computer is configured as a pipeline management server; and wherein the method further includes the steps of:

managing pipeline management client entity data records related to at least one pipeline management client entity by the pipeline management server, and managing by the pipeline management server project data records related to the at least one pipeline project, relating each project data record to a pipeline management client entity data record.

16. A computer-implemented method of managing and analyzing conditions of pipeline structures, the method including the steps of:

determining in a first computer process a comparative segment risk related to each of a plurality of pipeline segments by a pipeline management computer configured as a pipeline management server responsive to a determined defect severity score, a determined probability of failure score, and a determined impact of failure score, the determined impact of failure score responsive to selected failure impact data related to the pipeline segment and pipeline failure impact test data stored in a database associated with the pipeline management server to allow a user to compare a risk of failure of each one of the plurality of pipeline segments due to observed defects with respect to each other of the plurality of pipeline segments, the determined impact of failure score defined as quantification of expected impact of failure based on a plurality of score values each being based on at least one of a plurality of expected impact results, each of the plurality of expected impact results having a corresponding impact point value, the expected impact of failure being at least two of on-site impact, off site impact, and pipeline project operation impact; and determining in a second computer process a comparative percentage of segment risk related to each of the plurality of pipeline segments by the pipeline management server responsive to the determined segment risk from the first computer process for each respective one of the plurality of pipeline segments and total risk of each of the plurality of pipeline segments defined as the sum of the determined segment risk for each of the plurality of pipeline segments, to provide the user with a relative percentage of risk of failure of each one of the plurality of pipeline segments with respect to each other of the plurality of pipeline segments, to thereby enhance pipeline failure risk management.

17. A computer-implemented method as defined in claim 16, the method further comprising the steps of:

selecting a subset of the plurality of pipeline segments for repair;

determining in a third computer process a total reduced risk percentage by the pipeline management server responsive to the repair selection and the percentage of segment risk from the second computer process for each of the plurality of pipeline segments selected for repair, to thereby enhance risk management, the total reduced risk percentage defined as a sum of the segment risk percentages for the pipeline segments selected for repair; and determining in a fourth computer process a residual risk percentage defined as a sum of the segment risk percentages from the second computer process for each of the plurality of pipeline segments remaining unselected for repair by the pipeline management server responsive to the repair selection to thereby enhance pipeline failure risk management.

18. A computer-implemented method as defined in claim 16, the method further comprising the step of selecting a defect score method from one of the following pipeline scoring methods: peak pipeline score, mean pipeline score, and mean defect score, to thereby determine the defect severity score.

19. A computer-implemented method as defined in claim 16, the method further comprising the steps of:
  determining in a fifth computer process an estimated repair cost of each of the pipeline segments by the pipeline management server responsive to pipeline repair section data and repair cost data for the observed defects; and
  establishing in a sixth computer process a separate comparative segment risk valuation for each of the plurality of pipeline segments by the pipeline management server responsive to the estimated repair cost from the fifth computer process and the determined segment risk from the first computer process for each respective pipeline segment to provide the user with a relative cost-effectiveness of repairing each respective one of the plurality of pipeline segments with respect to each other of the plurality of pipeline segments, to thereby enhance pipeline repair cost management.

20. A computer-implemented method as defined in claim 19, the method further comprising the steps of:
  selecting a subset of the plurality of pipeline segments for repair;
  determining in a seventh computer process a total allocated budget by the pipeline management server responsive to the determined repair cost from the fifth computer process and the repair selection, the total allocated budget defined as a sum of the determined repair costs for each of the plurality of pipeline segments selected for repair;
  determining in a eighth computer process a percent allocated budget by the pipeline management server responsive to the total allocated budget from the seventh computer process and a total available budget to enhance pipeline repair cost management to thereby enhance pipeline repair budgeting, the percent allocated budget defined as a percentage of the total allocated budget relative to the total available budget; and
  indicating by the pipeline management server to a user when the total allocated budget exceeds the total available budget.

21. A computer-implemented method as defined in claim 16, the method further comprising the steps of:
  receiving from the user by the pipeline management server a defect severity weight, a probability of failure weight, and an impact of failure weight; and
  adjusting in a ninth computer process the defect severity, probability of failure, and impact of failure for the comparative segment risk from the first computer process for each of the plurality of pipeline segments by the pipeline management server, responsive to the weights, to thereby tailor the segment risk of each of the plurality of pipeline segments to a user selected relative importance of defect severity, probability of failure, and impact of failure of the observed defects.

22. A non-transitory computer readable medium that is readable by a computer to manage and analyze conditions of pipeline structure, the computer readable medium comprising a set of instructions that, when executed by the computer, cause the computer to perform the following operation:
  determining a comparative segment risk related to each of a plurality of pipeline segments of a pipeline structure utilizing a risk algorithm comprising a determined defect severity score, a determined probability of failure score, and a determined impact of failure score to allow a user to compare a risk of failure of each one of the plurality of pipeline segments due to observed defects with respect to each other of the plurality of pipeline segments, to thereby enhance pipeline risk management.

23. A non-transitory computer readable medium as defined in claim 22, the computer readable medium further comprising a set of instructions that, when executed by the computer, cause the computer to perform the following operation:
  determining a comparative percentage of segment risk related to each of the plurality of pipeline segments responsive to the determined segment risk for each respective one of the plurality of pipeline segments and total risk of each of the plurality of pipeline segments defined as the sum of the determined segment risk for each of the plurality of pipeline segments, to provide the user with a relative percentage of risk of each one of the plurality of pipeline segments with respect to each other of the plurality of pipeline segments, to thereby enhance pipeline risk management.

24. A non-transitory computer readable medium as defined in claim 23, the computer readable medium further comprising a set of instructions that, when executed by the computer, cause the computer to perform the following operations:
  receiving a pipeline segment repair selection status for a subset of the plurality of pipeline segments selected for repair responsive to user input; and
  determining a total reduced risk percentage responsive to the repair selection and the percentage of segment risk for each of the pipeline segments selected for repair, to thereby enhance risk management, the total reduced risk percentage defined as a sum of the segment risk percentages for the pipeline segments selected for repair.

25. A non-transitory computer readable medium as defined in claim 24, the computer readable medium further comprising a set of instructions that, when executed by the computer, cause the computer to perform the following operation:
  determining a residual risk percentage defined as a sum of the segment risk percentages for each of the pipeline segments remaining unselected for repair responsive to the repair selection to thereby enhance pipeline failure risk management.

26. A non-transitory computer readable medium as defined in claim 22, the computer readable medium further comprising a set of instructions that, when executed by the computer, cause the computer to perform the following operations:
  determining an estimated repair cost of each of the pipeline segments responsive to pipeline repair section data and repair cost data for the observed defects; and
  establishing a separate comparative segment risk valuation for each of the plurality of pipeline segments responsive to the estimated repair cost and the determined segment risk for each respective pipeline segment to provide the user with a relative cost-effectiveness of repairing each respective one of the plurality of pipeline segments with respect to each other of the plurality of pipeline segments, to thereby enhance pipeline repair cost management.

27. A non-transitory computer readable medium as defined in claim 26, the computer readable medium further comprising a set of instructions that, when executed by the computer, cause the computer to perform the following operations:

receiving a pipeline segment repair selection status for a subset of the plurality of pipeline segments selected for repair responsive to user input;

determining a total allocated budget responsive to the determined repair cost and the repair selection, the total allocated budget defined as the sum of the determined repair costs for each of the plurality of pipeline segments selected for repair;

determining a percent allocated budget responsive to the total allocated budget and a total available budget to enhance pipeline repair cost management to thereby enhance pipeline repair budgeting, the percent allocated budget defined as the percentage of the total allocated budget relative to the total available budget; and indicating to a user when the total allocated budget exceeds the total available budget.

28. A non-transitory computer readable medium as defined in claim 22, wherein a risk algorithm used to determine the comparative segment risk includes a determined defect severity score, a determined probability of failure score, a determined impact of failure score, the computer readable medium further comprising a set of instructions that, when executed by the computer, cause the computer to perform the following operations:

receiving a defect severity weight, a probability of failure weight, and an impact of failure weight responsive to user input; and adjusting the defect severity score, probability of failure score, and impact of failure score for the comparative segment risk for each of the plurality of pipeline segments, responsive to the weights, to thereby tailor the segment risk of each of the plurality of pipeline segments to a user selected relative importance of defect severity, probability of failure, and impact of failure of the observed defects.

29. A non-transitory computer readable medium as defined in claim 28, the computer readable medium further comprising a set of instructions that, when executed by the computer, cause the computer to perform the following operations:

providing a user a selection of defect score methods to determine the defect severity score; and receiving a user selected defect score method selected from one of the following pipeline scoring methods: peak pipeline score, mean pipeline score, and mean defect score.

30. A system as defined in claim 1, wherein the pipeline failure impact test data includes tabular data indicating a score for: impact of failure to onsite groundwater contamination, impact of failure to offsite groundwater contamination, impact of failure to onsite surface water contamination, and impact of failure to offsite surface water contamination, resulting from failure of the pipeline segment.

31. A system as defined in claim 1, wherein the pipeline failure impact test data includes tabular data indicating a score for: impact of failure to violation of local environmental regulations, impact of failure to violation of state environmental regulations, and impact of failure to violation of federal environmental regulations, resulting from failure of the pipeline segment.

32. A system as defined in claim 1, wherein the pipeline structure comprises a municipal sewer system, and wherein the pipeline structure includes two or more of the following: steel pipe, concrete pipe, polyvinyl chloride (PVC) pipe, and clay pipe.

* * * * *